United States Patent
Gates et al.

(10) Patent No.: US 9,462,783 B2
(45) Date of Patent: Oct. 11, 2016

(54) PASSIVE ANIMAL FEEDER HAVING FEED TROUGHS

(71) Applicant: All Seasons Feeders, Ltd., San Antonio, TX (US)

(72) Inventors: Burnell Gates, San Antonio, TX (US); Zach Gates, San Antonio, TX (US)

(73) Assignee: All Seasons Feeders, Ltd., San Antonio, TX (US)

( * ) Notice: Subject to any disclaimer, the term of this patent is extended or adjusted under 35 U.S.C. 154(b) by 0 days.

(21) Appl. No.: 14/931,422

(22) Filed: Nov. 3, 2015

(65) Prior Publication Data

US 2016/0095291 A1 Apr. 7, 2016

Related U.S. Application Data

(63) Continuation-in-part of application No. 14/244,009, filed on Apr. 3, 2014, now Pat. No. 9,204,619, which is a continuation-in-part of application No. 12/290,387, filed on Oct. 30, 2008, now Pat. No. 8,689,737.

(51) Int. Cl.
- *A01K 5/00* (2006.01)
- *A01K 5/02* (2006.01)
- *A01K 5/01* (2006.01)

(52) U.S. Cl.
CPC ............... *A01K 5/01* (2013.01); *A01K 5/0225* (2013.01)

(58) Field of Classification Search
CPC .......................... A01K 5/0225; A01K 39/012

USPC ......... 119/57.91, 51.01, 52.2, 52.1, 53, 53.5, 119/54, 57.1, 57.4, 61.2

See application file for complete search history.

(56) References Cited

U.S. PATENT DOCUMENTS

| | | | |
|---|---|---|---|
| 2,667,858 A * | 2/1954 | Cussotti | A01K 39/012 119/52.1 |
| 3,034,480 A | 5/1962 | Alton | |
| 3,962,997 A | 6/1976 | Ruth | |
| 3,965,868 A * | 6/1976 | Hunziker, Jr. | A01K 5/0225 119/464 |
| 4,582,023 A | 4/1986 | Zumbahlen | |
| 4,892,060 A * | 1/1990 | Lundquist | A01K 39/012 119/52.2 |
| 4,986,220 A | 1/1991 | Reneau | |
| 5,066,388 A | 11/1991 | Ross | |
| 5,069,164 A | 12/1991 | Wiwi | |
| 5,143,289 A | 9/1992 | Gresham | |
| 5,259,337 A * | 11/1993 | Rasmussen | A01K 5/0275 119/57.1 |
| 5,333,572 A | 8/1994 | Nutt | |
| 5,503,090 A | 4/1996 | Guzan | |
| 5,572,948 A * | 11/1996 | Womack | A01K 39/012 119/53 |

(Continued)

*Primary Examiner* — Yvonne Abbott-Lewis
(74) *Attorney, Agent, or Firm* — Kirby B. Drake; Klemchuk LLP

(57) ABSTRACT

A wildlife feeder having a hopper, a manifold, and a removed head at a removed end of the manifold. The hopper is designed to enclose particulate feed, such as corn, for dispensing through the manifold and head to wildlife. The head has a multiplicity of feed troughs and each feed trough has an angled top wall and an angled bottom wall, angled with respect to a longitudinal axis of the manifold and a plane of a tabular floor of the head. The head may include a perforated material to assist in allowing moisture and dust to escape from the feed.

10 Claims, 35 Drawing Sheets

(56) References Cited

U.S. PATENT DOCUMENTS

| | | | |
|---|---|---|---|
| 5,855,943 A | 1/1999 | Lush et al. | |
| 5,862,777 A | 1/1999 | Sweeney | |
| 5,924,381 A * | 7/1999 | Bloedorn | A01K 39/012 119/429 |
| 5,967,083 A | 10/1999 | Kleinsasser | |
| 6,199,509 B1 | 3/2001 | Mostyn | |
| 6,450,120 B1 * | 9/2002 | Nylen | A01K 39/012 119/52.2 |
| 6,510,813 B1 * | 1/2003 | Boone, Jr. | A01K 39/012 119/57.91 |
| 6,722,311 B1 | 4/2004 | Sides et al. | |
| 6,763,781 B1 | 7/2004 | Norrell | |
| 6,899,056 B1 | 5/2005 | Kelly | |
| 6,920,841 B2 * | 7/2005 | Meritt | A01K 1/10 119/51.01 |
| 6,920,842 B1 | 7/2005 | Davis | |
| 7,175,103 B1 | 2/2007 | Barley | |
| 7,222,583 B2 * | 5/2007 | Foster | A01K 5/0225 119/57.91 |
| 7,302,912 B2 | 12/2007 | Boyer | |
| 7,370,605 B2 | 5/2008 | Meritt | |
| 7,404,376 B2 | 7/2008 | Hernandez | |
| D681,883 S * | 5/2013 | Meritt | D30/121 |
| 8,689,737 B2 * | 4/2014 | Gates | A01K 5/0225 119/53 |
| 2006/0048712 A1 * | 3/2006 | Boyer | A01K 5/0225 119/57.91 |
| 2006/0060148 A1 * | 3/2006 | Boyer | A01K 5/0225 119/57.91 |
| 2006/0283396 A1 * | 12/2006 | Hernandez | A01K 5/0225 119/51.13 |
| 2007/0028844 A1 * | 2/2007 | Bodenstab | A01K 5/0225 119/52.1 |
| 2008/0257270 A1 | 10/2008 | Slankard | |
| 2009/0120369 A1 | 5/2009 | Lewis | |

* cited by examiner

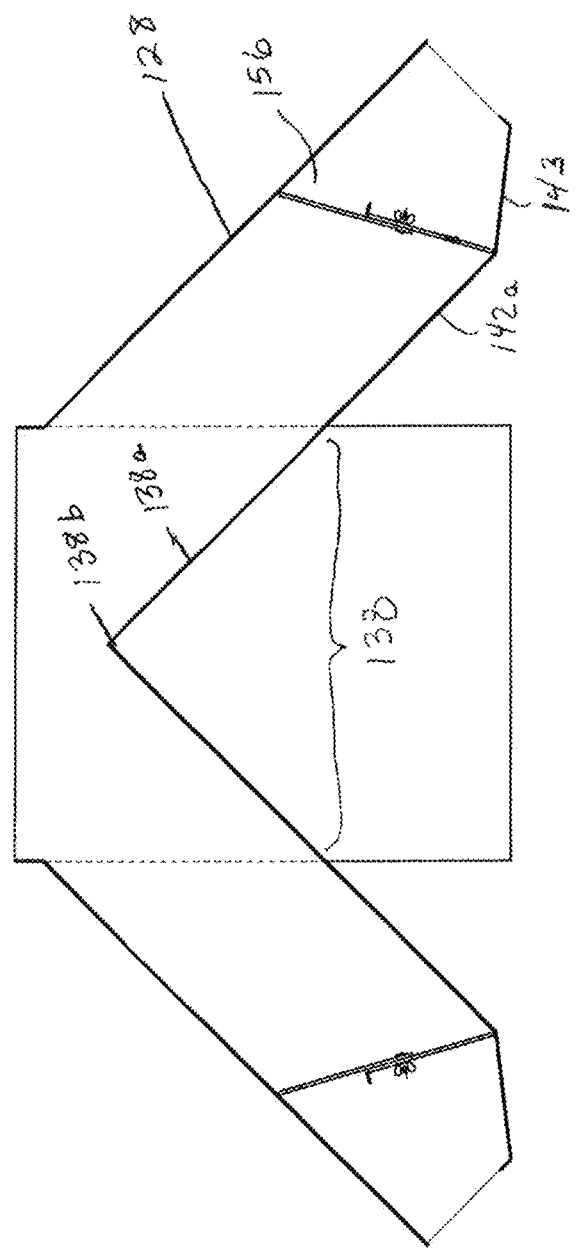

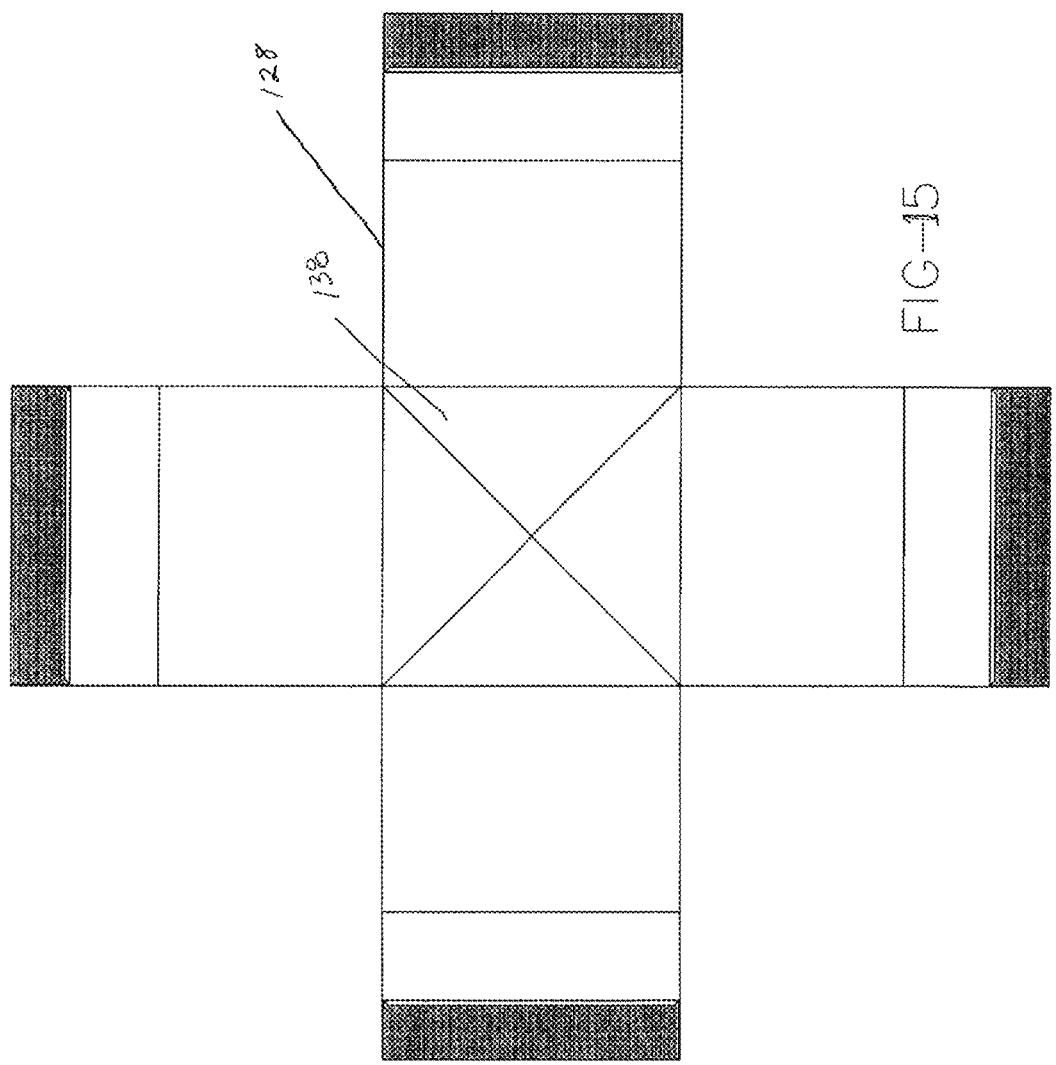

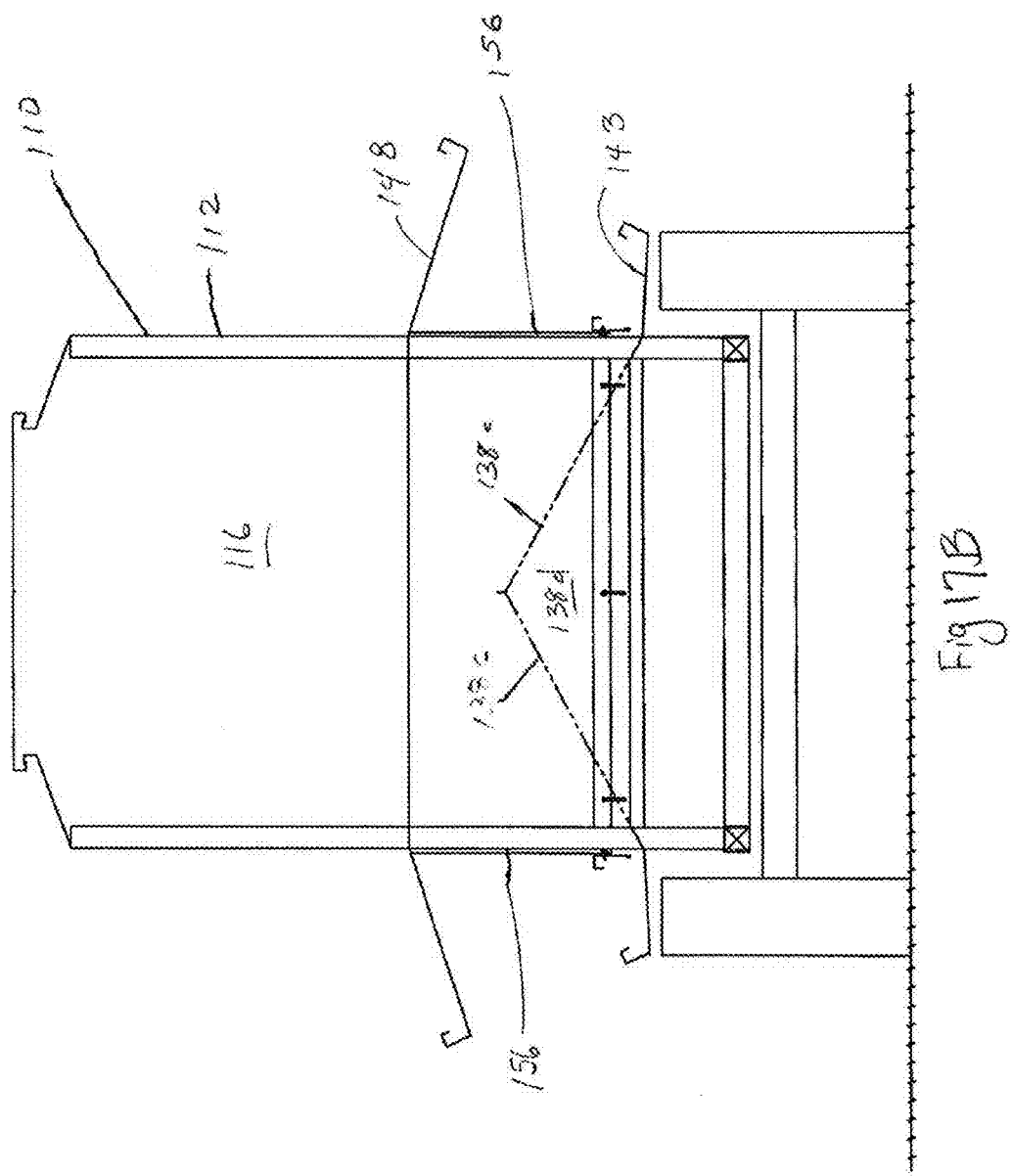

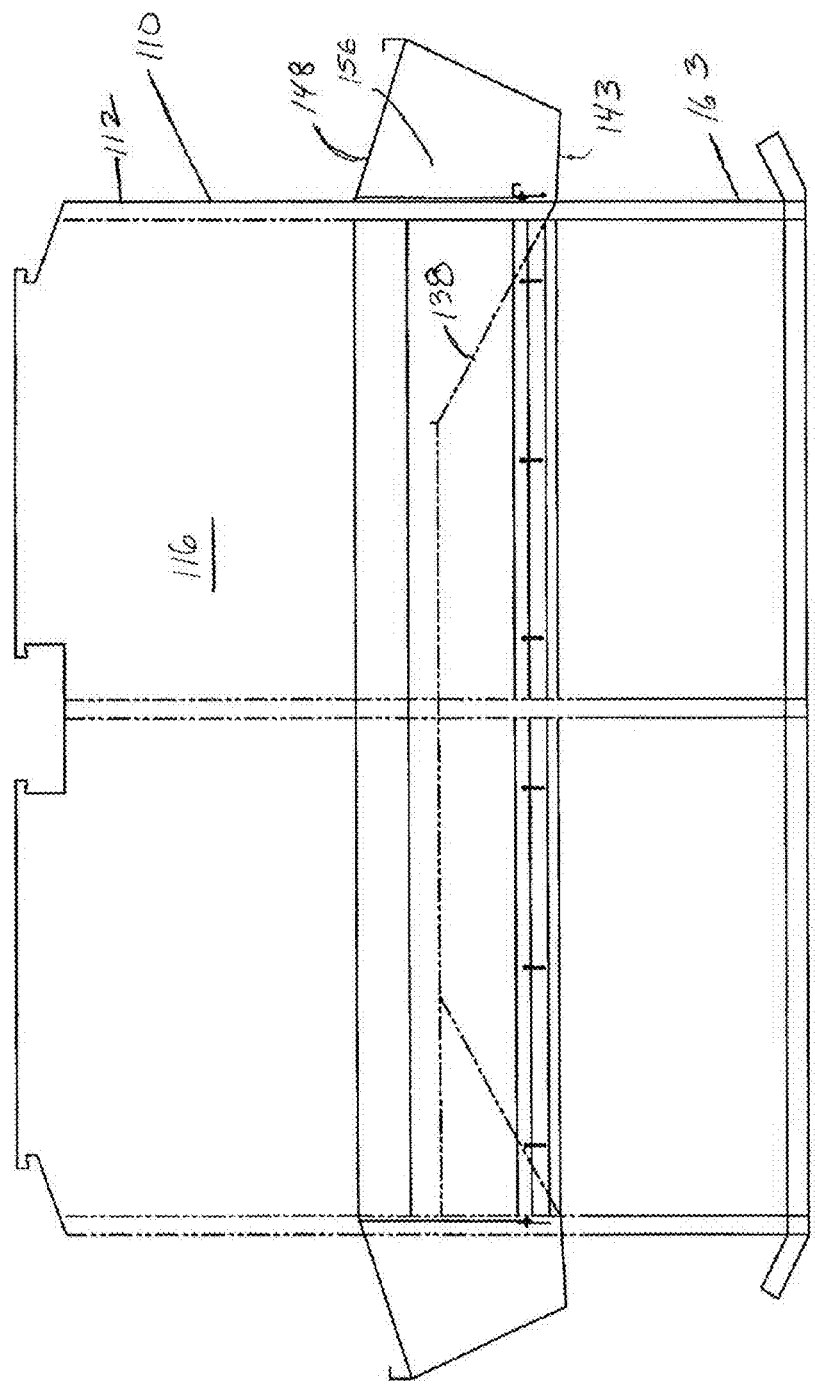

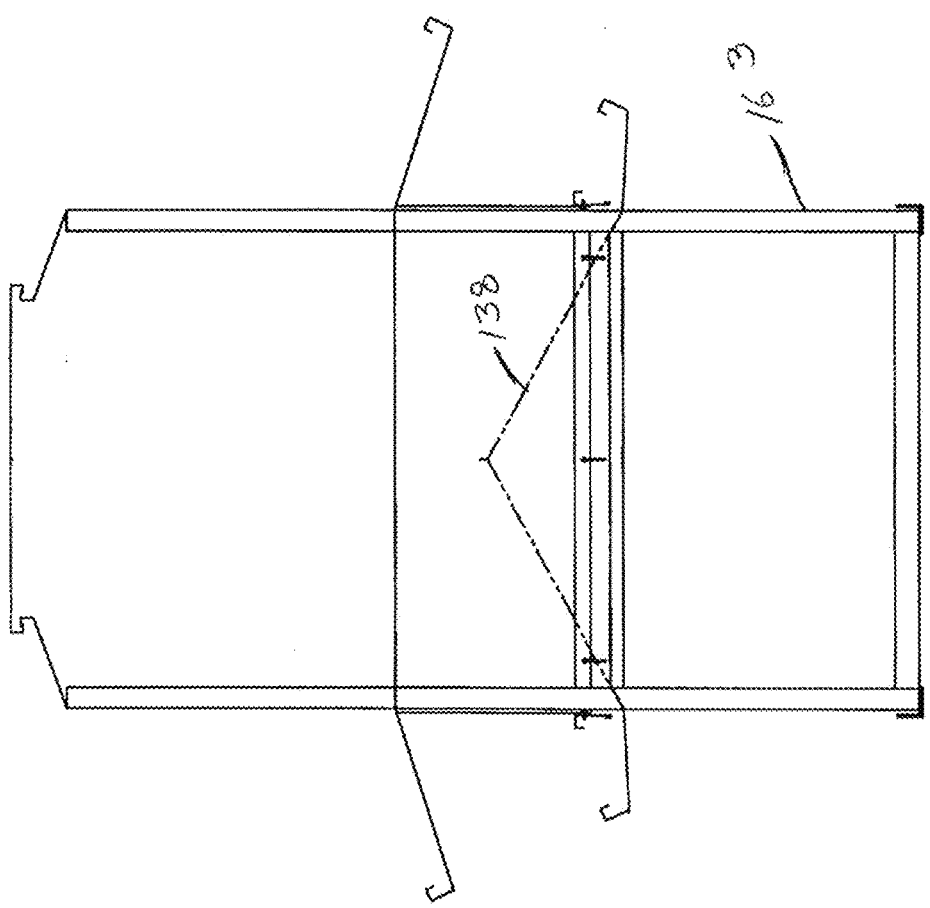

PASSIVE ANIMAL FEEDER HAVING FEED TROUGHS

CROSS REFERENCE TO RELATED APPLICATIONS

This application is a continuation-in-part of U.S. application Ser. No. 14/244,009 filed on Apr. 3, 2014 which is a continuation-in-part of U.S. Pat. No. 8,689,737, both of which are incorporated by reference in their entirety.

FIELD OF THE DISCLOSURE

The present disclosure generally relates to animal feeders, namely, animal feeders including a hopper, a cleanout manifold, and a dispensing head.

BACKGROUND

Animal feeders, including wildlife feeders, dispense feed, typically pelletized, granular, and particulate feed, such as corn, soybeans, and nutritional supplements. Wildlife feeders may be passive, wherein a hopper delivers particulate feed to animals through a multiplicity of tubes or passages under the impetus of gravity. Some of the tubes are designed for access by the muzzle of a deer, elk, cattle or the like. Other wildlife feeders are active, having electrical motors operated on timers, which periodically cast feed. With most casting type feeders, the animals simply eat the food from the ground. The outdoor environment in which wildlife feeders are placed includes exposure to elements which may deteriorate feed, and exposure to clever animals, which may deplete the feed intended for deer or the like. While most prior art wildlife feeders have hoppers and feed troughs which keep the available feed well above the ground, critters and weather create problems, including wet feed and deletion of feed stores.

SUMMARY

There is a need for a passive wildlife or domesticated animal feeder which allows access to the feed in a head spaced below a hopper, while at the same time protecting exposure to harsh atmospheric forces (wind, rain, sleet, snow, direct sunlight, etc.) and the feed from "unwanted" critters (raccoons, squirrels, rodents, etc.), for which the feed is not intended.

Embodiments of the present disclosure may provide a wildlife feeder for resting on the ground placement having a hopper with downwardly sloping bottom walls, generally vertical hopper side walls, and a top wall. The wildlife feeder may have legs for engaging the hopper side walls to support the hopper above the ground. A manifold having a longitudinal axis may be mounted to the bottom of the hopper and depending generally vertically downward from the sloping bottom walls of the hopper. The manifold may have a mouth at an upper end thereof and a feed supply opening at the bottom end thereof and a cross-section. A head for engaging the manifold may be provided with a plurality of feed troughs. The head may receive palletized, granular or particulate feed from the feed supply opening of the manifold at a bottom end of the manifold. The head may be comprised of a horizontal floor, generally laying in a horizontal plane, the floor being perpendicular to the longitudinal axis of the manifold. Each feed trough may have a bottom wall, a pair of side walls and a top wall. The floor may have a perimeter, the perimeter joining the bottom walls of the feed trough. The bottom walls of the feed troughs may transcribe an angle with respect to the floor of the head that may, in one embodiment, be between about 5-30°. The top walls of the feed troughs may transcribe an angle that may, in one embodiment, be of between about 110-155° with respect to the longitudinal axis of the manifold. The bottom wall may include a recessed upturned lip, the lip having a top edge, the top edge with a height that is preferably below the plane of the tabular floor of the head.

Other embodiments of the present disclosure may provide animal feeder for placement on the ground, the wildlife feeder comprising a hopper having, in some embodiments, a downwardly sloping bottom wall, generally vertical hopper side walls, and a top wall that may include a lid. A plurality of legs may engage the hopper to support the hopper above the ground or on a trailer or skid. A head may engage the hopper directly or through a manifold. The head may engage side walls or bottom walls of the hopper. The head may have a multiplicity of downward and outward depending feed troughs, each having a feed opening to receive particulate feed from the hopper and having a mouth at a removed end thereof. Each feed trough has a flat bottom wall, a pair of flat side walls and a flat top wall. The head receives feed from the hopper. The head may include a floor. In some embodiments, the feed trough bottom walls may include a flat first portion at a near end thereof, which first portion is substantially parallel to the top wall and a second, smaller in area, non-parallel, flat portion that is angled up, towards the top wall. Some embodiments may have only the non-parallel portion as the bottom wall. Each of the feed trough bottom walls may include at the mouth, an upturned lip, each upturned lip having a top edge.

Further embodiments of the present disclosure may provide an animal feeder for placement on the ground, the animal feeder comprising a hopper having a generally vertical hopper side walls and a top wall, a plurality of legs engaging the hopper to support the hopper above a support surface, a head engaging the hopper, the head having a multiplicity of depending feed troughs, each having a feed opening to receive particulate feed from the hopper and having a mouth at a removed end thereof, wherein each feed trough has a bottom wall, a pair of flat side walls and a flat top wall, the head receiving feed from the hopper, wherein the head further comprises a floor, wherein the floor has a perimeter, wherein each of the feed trough bottom walls includes a flat portion non-parallel to the top wall, that is angled up, towards the top wall, and wherein each of the feed trough bottom walls includes at the mouth, an upturned lip, each upturned lip having a top edge, and wherein the head includes a perforated material to filter dust and moisture from the particulate feed. The perforated material may be releasably secured to the head, integrally formed with the head, permanently attached to head such as through welding, and/or stamped into a bottom metal structure of the head. The feeder may include a manifold engaging the hopper to the head and placing the head below the hopper, the manifold to carry particulate feed from the hopper to the head and the manifold including a perforated material. The floor may include an upturned and pointed portion positioned below a particulate feed flow path originating at the hopper, wherein the feed trough side walls make, with respect to the longitudinal axis of the wildlife feeder, an angle in the range of about 30 to 60 degrees, and further comprising a perforated material for controlling the amount of dust and moisture associated with the feed entering the head from the hopper. The perforated material may be positioned on the floor of the head. The perforated material also may be positioned on the flat portion of each of the feed trough bottom walls.

Other technical features may be readily apparent to one skilled in the art from the following figures, descriptions and claims.

BRIEF DESCRIPTION OF THE DRAWINGS

For a more complete understanding of this disclosure, reference is now made to the following description, taken in conjunction with the accompanying drawings, in which:

FIG. 1A illustrates a conical hopper with conical bottom walls and a conical manifold leading to head 28;

FIG. 14A is a sectional side view of a head for an animal feeder according to an embodiment of the present disclosure;

FIG. 15 is a top view of the interior showing the floor and bottom walls of the head of an animal feeder according to an embodiment of the present disclosure;

FIGS. 17A and 17B are elevational and rear views of a version of an animal feeder according to an embodiment of the present disclosure that includes a trailer;

FIGS. 18A and 18B are elevational and rear views of an animal feeder according to an embodiment of the present disclosure that includes a skid;

DETAILED DESCRIPTION

Figure 1:
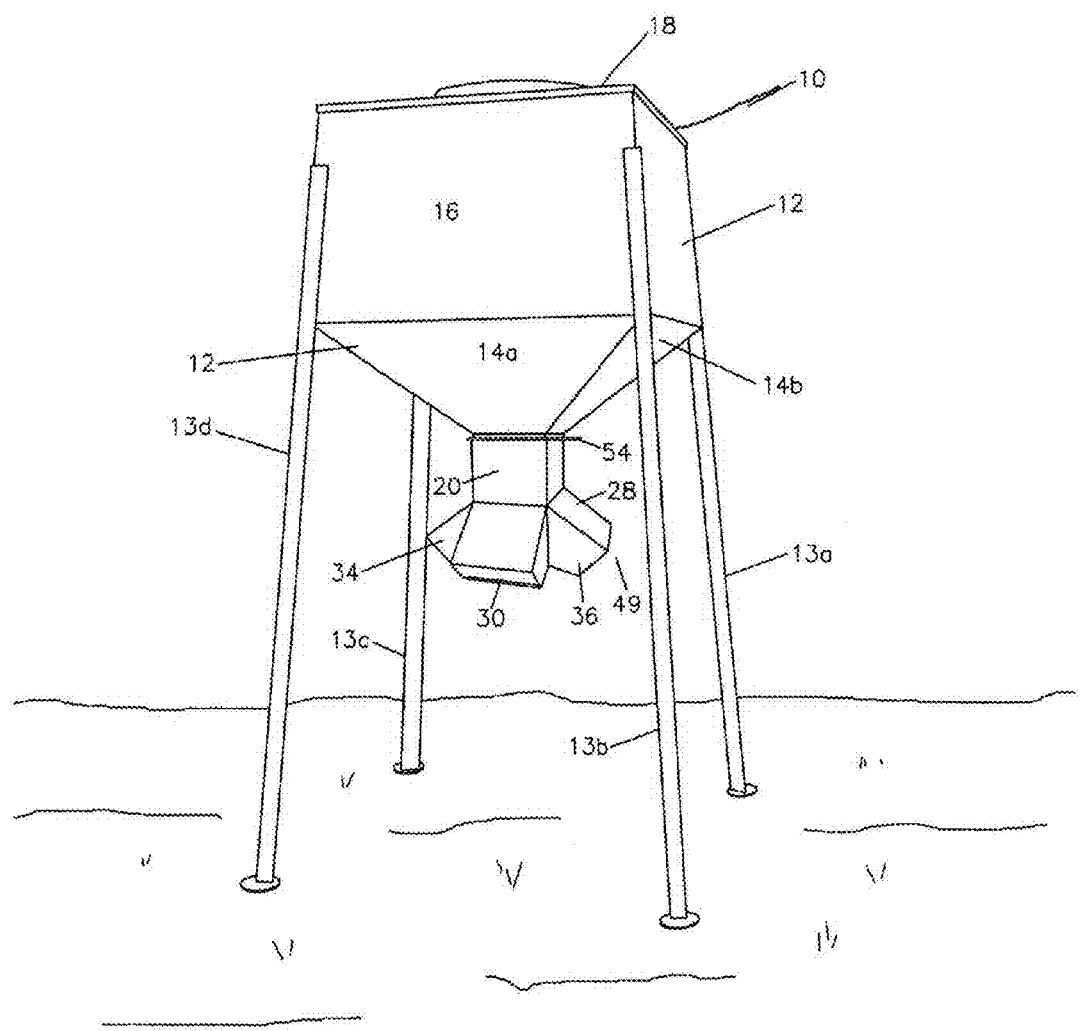
FIGS. 1 and 1A illustrate perspective views of an animal feeder according to an embodiment of the present disclosure, the difference being that FIG. 1 illustrates a rectangular hopper having rectangular bottom walls and a rectangular manifold leading to head 28.
Figure 1A:
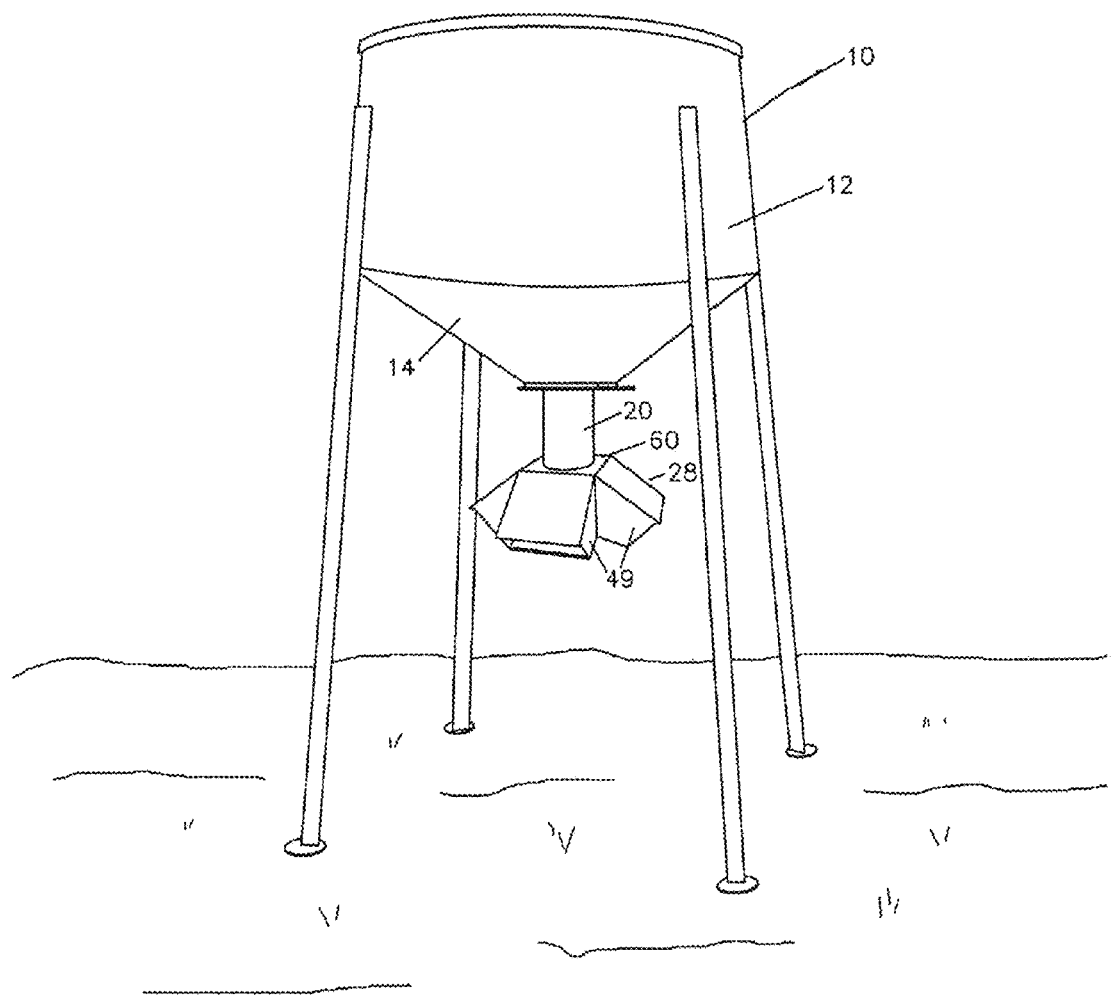

FIG. 1 illustrates wildlife feeder 10 according to an embodiment of the present disclosure. Wildlife feeders are known in the art to dispense palletized, granular, and particulate wildlife feed, such as corn, protein pellets, peas, soybeans and nutritional supplements to wildlife, such as deer and elk. Wildlife feeders 10 may be constructed having a storage hopper section 12 (element 112 in FIG. 9) for retaining and maintaining the feed therein. Hopper 12 may be spaced apart vertically above the ground on legs 13 a, 13 b, 13 c, and 13 d. Hopper 12 may be generally rectangular in shape as illustrated in FIG. 1, and may include a multiplicity of generally vertical (or slanted slightly outward, see FIG. 9) side walls 16. In alternate embodiments, hopper 12 may be cylindrical as illustrated in FIG. 1A. Hopper 12 may include bottom wall 14, typically sloping downwardly from the generally vertical hopper side walls. Bottom walls may be conical (FIG. 1A) or comprised of a number of sections 14 a and 14 b, as illustrated in FIG. 1 (the two other remaining sections of bottom wall 14 being hidden in the view illustrated in FIG. 1). Hopper 12 may include top wall 18 (element 118, FIG. 9), which may be removable, or fixed to the hopper side walls, in which case there would be an access opening somewhere in the hopper, for example, a small separate lid (not shown) comprising a portion of the top wall.

Sloped bottom walls 14 may engage, in one embodiment of the present disclosure, generally vertically manifold 20 for delivery of feed from the sloping bottom wall at the base of the hopper to head 28. In one embodiment of wildlife feeder 110 (FIG. 9), head 128 may directly engage tabular bottom walls 114a/114b (and those not shown) without a manifold. Short manifold 120 may be seen in FIG. 9A and some of those illustrations following FIG. 9A. Turning back to FIG. 1, the head may be comprised of a multiplicity of feed troughs, typically one to four, here illustrated as feed troughs 30, 32, 34, and 36. Optionally, sliding gate assembly 54 (element 154, FIG. 9) may be provided between sloping bottom walls 14/114 of hopper 12/112 and head 28/128. Gate assemblies 54/154 may provide structure for controlling the flow of feed from the hopper to the manifold and/or the head.

Turning now to FIGS. 1, 2, 3, 4, and 5, manifold 20 may be cylindrical (see FIG. 1A) or rectangular (see FIG. 1) and may be hollow. Manifold 20 may include mouth 22 at the uppermost portion thereof for receiving feed from upper hopper 12. Generally vertical walls may define throat 24 for carrying feed through the manifold to a multiplicity of feed openings 26. The feed openings and the bottom end of the manifold may allow particulate feed to enter the housing. Manifold 20 has a longitudinal axis "A."

Figure 2:
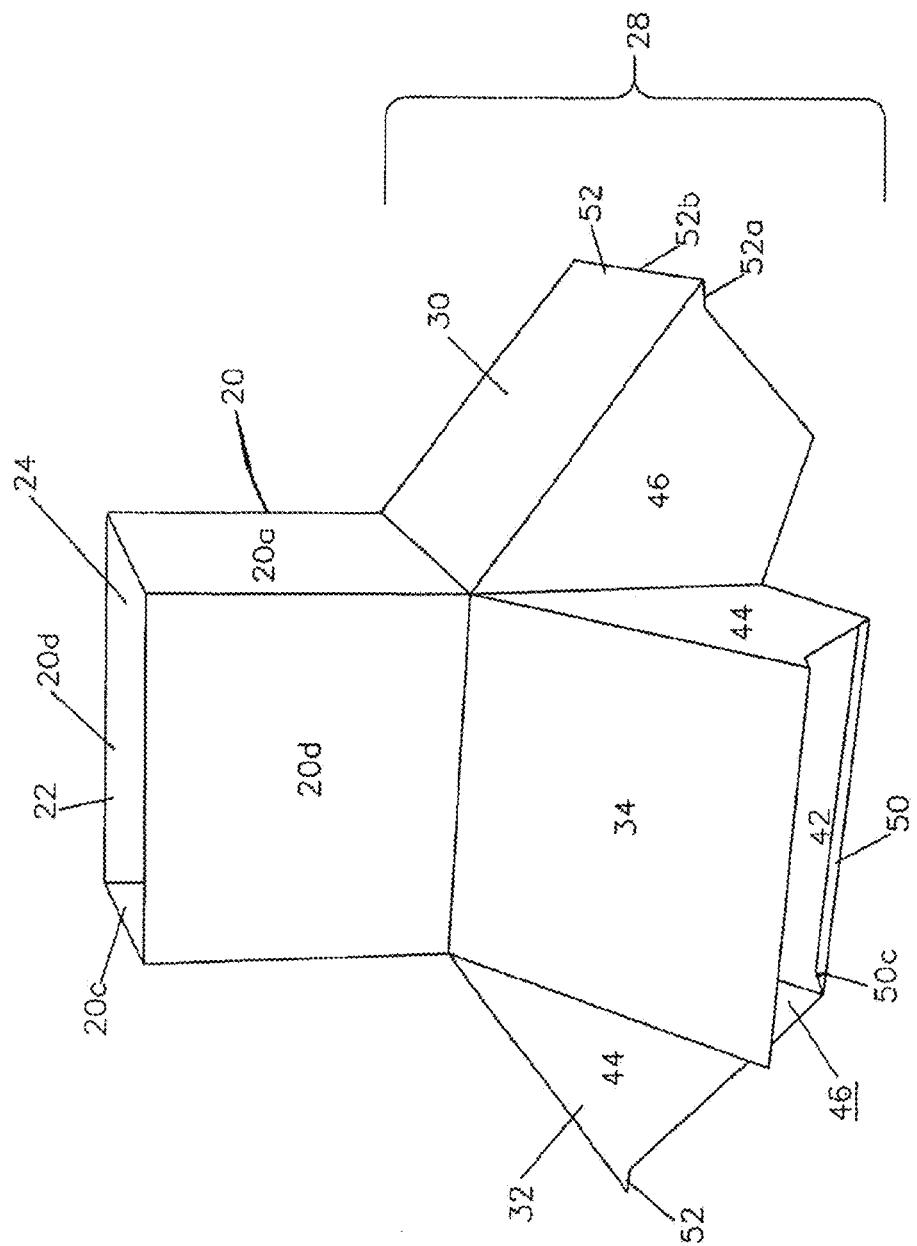
FIG. 2 is a perspective external view of the manifold and head of an animal feeder according to an embodiment of the present disclosure.
Figure 3:
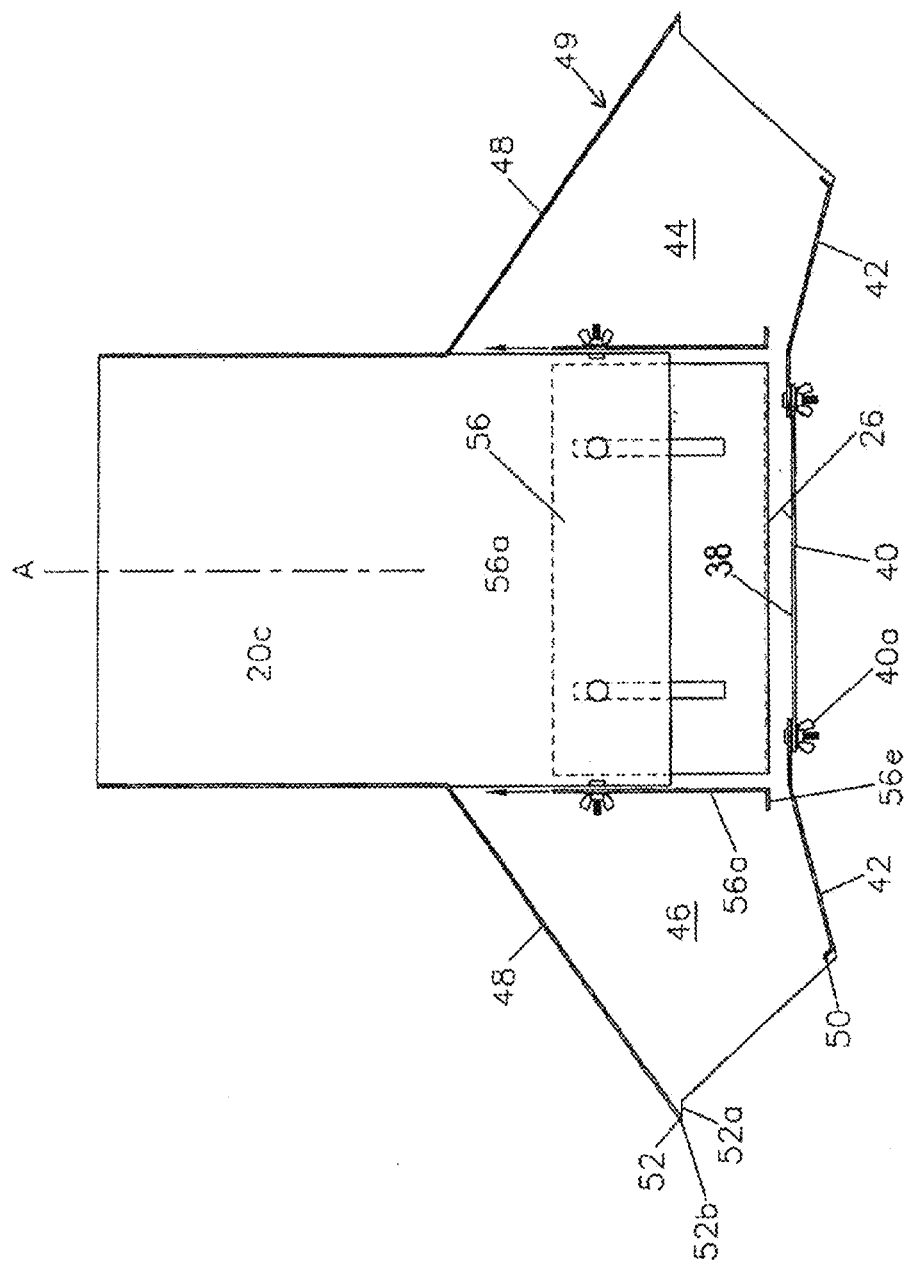
FIG. 3 illustrates a cross-sectional view of a manifold and head for an animal feeder according to an embodiment of the present disclosure.
Figure 4:
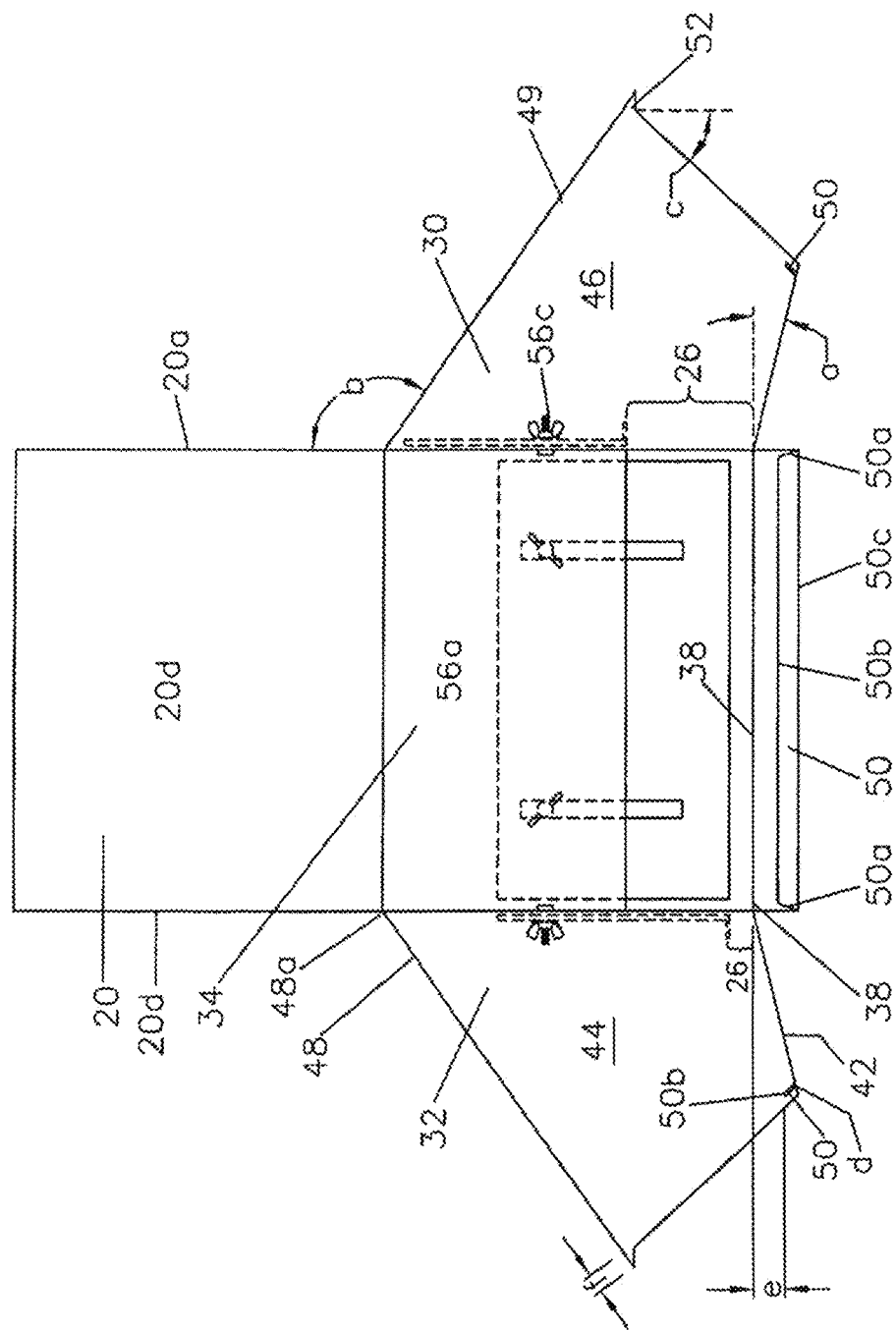
FIG. 4 illustrates a side elevational view of a manifold and head for an animal feeder according to an embodiment of the present disclosure.
Figure 5:
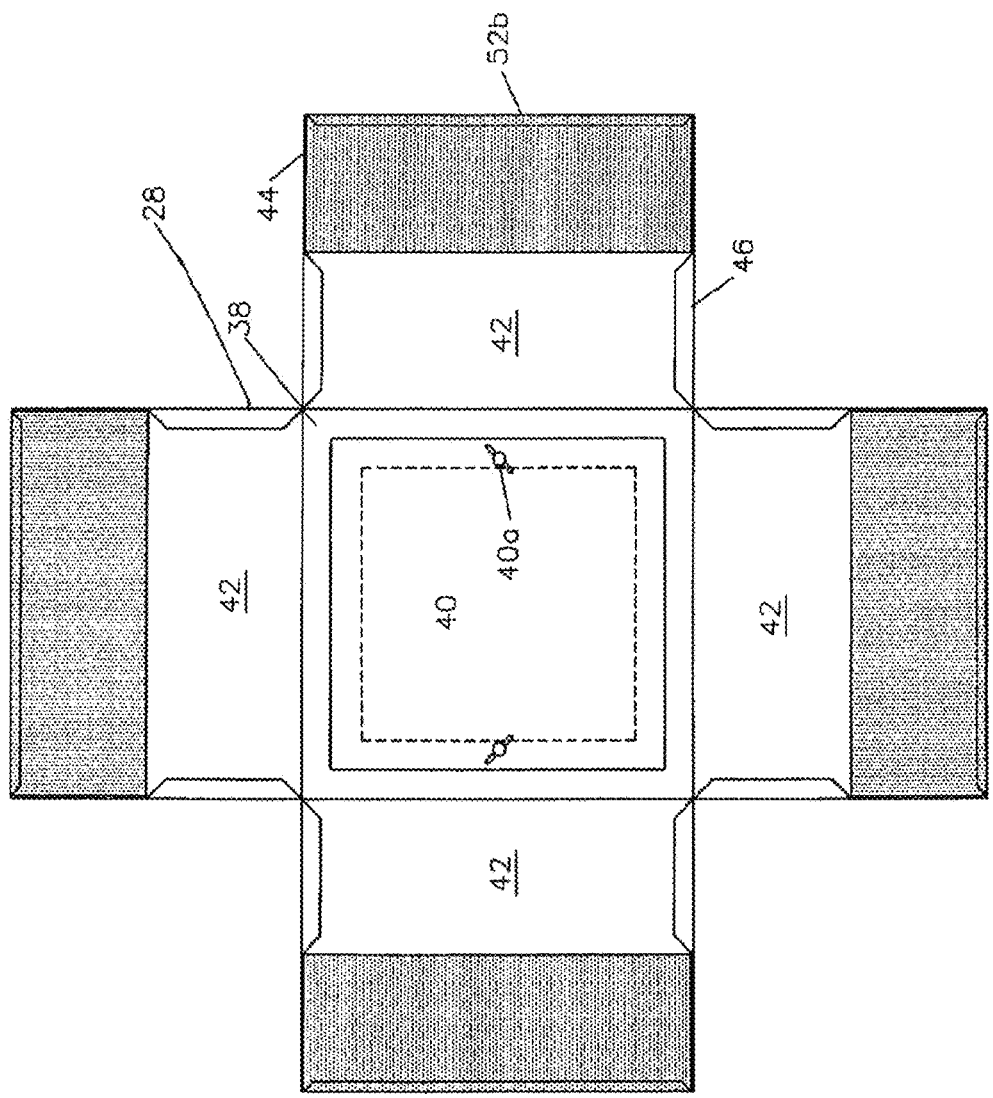
FIG. 5 illustrates a bottom elevational view of the head of an animal feeder according to an embodiment of the present disclosure.
Figure 14:
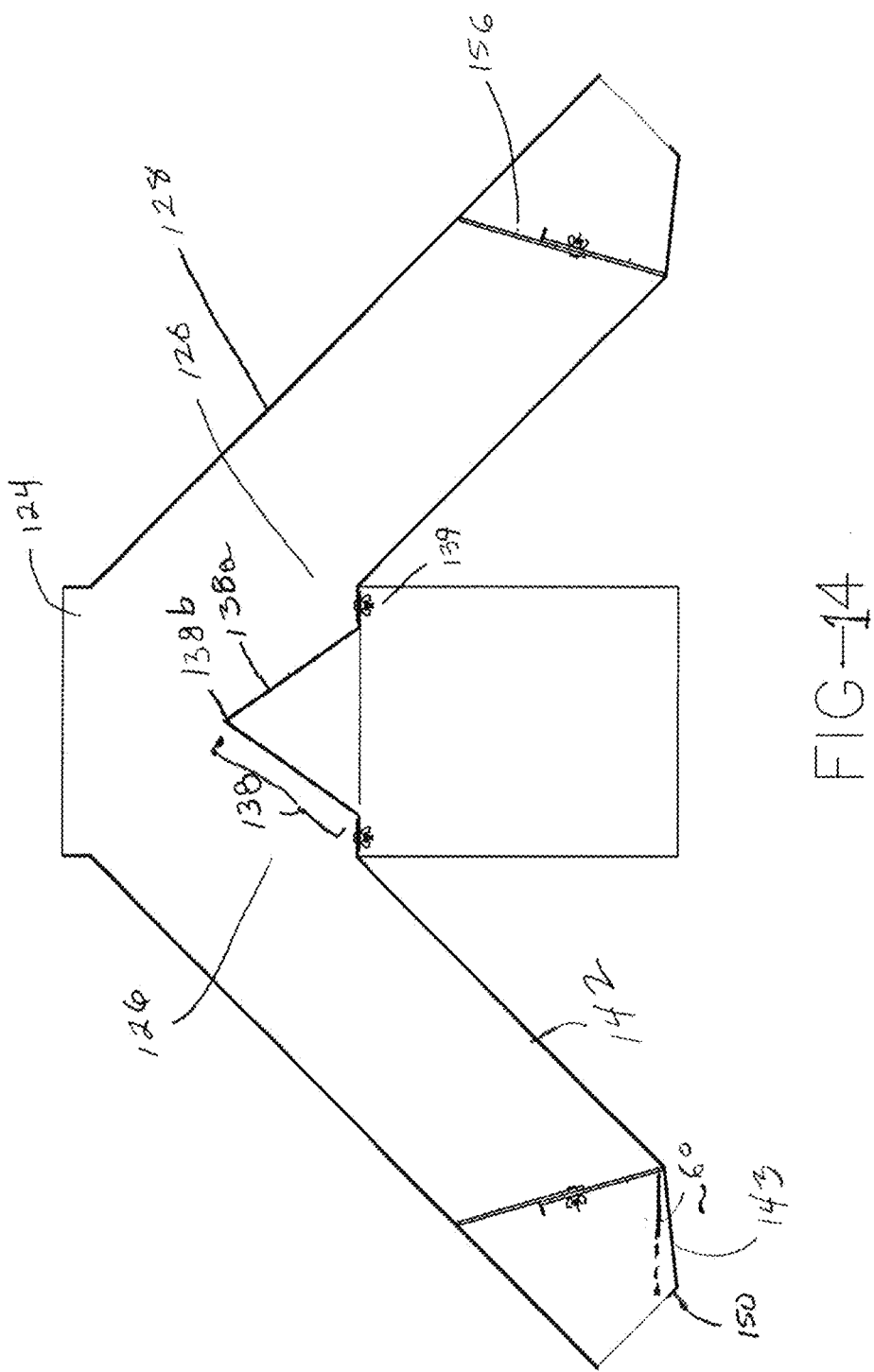
FIG. 14 is a sectional side view of a head for an animal feeder according to an embodiment of the present disclosure.
Figure 15A:
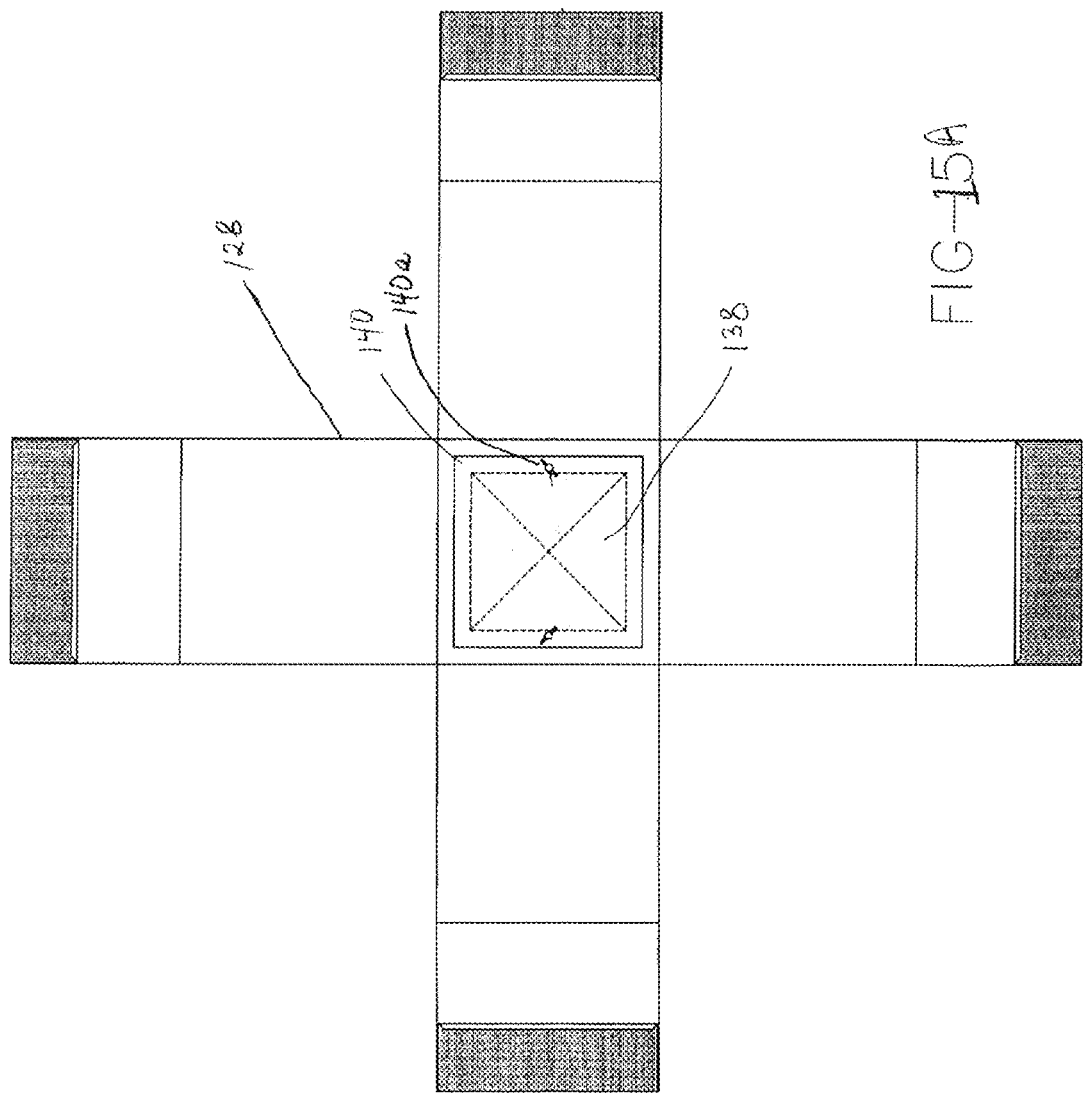
FIG. 15A is a top view of the interior showing the floor and bottom walls of the head of an animal feeder according to an embodiment of the present disclosure.

As seen in FIGS. 2, 3, and 4, head 28 also may have a multiplicity of feed troughs 30, 32, 34, 36 extending laterally outward and downward from axis "A". Head 28 also may be comprised of floor 38, which floor is perpendicular to manifold axis A and generally tabular. Floor 38 may include removable cleanout plate 40, which would typically be held in place by hand engageable fasteners 40a, such as wing nuts. Floor 138 in an alternate embodiment 110, as seen in FIG. 14, may include upstanding cone or pyramid portion 138a, which may be four walled, or conical, with a wide base that comes to a point 138b. Point 138b may be centered beneath throat 124, or otherwise positioned below the hopper such that particulate feed will be directed to feed openings 126. Fasteners 139 may removably attach floor 138 to the head to allow cleanout.

Turning now to the feed troughs, the troughs may be constructed in a substantially identical manner in an embodiment of the present disclosure. Feed troughs may include tabular bottom wall 42, upstanding side walls 44, 46, and top wall 48. These walls are designated 142/144/146/148 in FIGS. 9 and 9A, alternate embodiment 110. The four walls collectively may define feed trough housing 49. The side walls of adjacent feed troughs typically connect to one another (see FIG. 5). The top walls may engage the manifold or hopper and the bottom walls may engage floor 38. In alternate embodiment 110 (see FIGS. 9 and 9a), bottom wall 142 may include angled-up portion 143, which may not be as steep as the non-angled-up portion and may act as a feed tray adjacent mouth 122, so animals can more easily reach the feed.

As seen in FIGS. 1-5, feed troughs 30, 32, 34, and 36 may include lower lip 50 (150 in alternate embodiment 110), which stands above bottom wall 42. As may be seen in FIG. 4, lower lip 50 may include a pair of lower lip side walls 50a, lower lip top edge 50b, and lower lip bottom edge 50c. Upper lip 52 may extend beyond side walls 44 and 46 and may be engaged therewith to oblique upper lip side walls 52a. Upper lip 52 may include upper lip front edge 52b.

Figure 12:
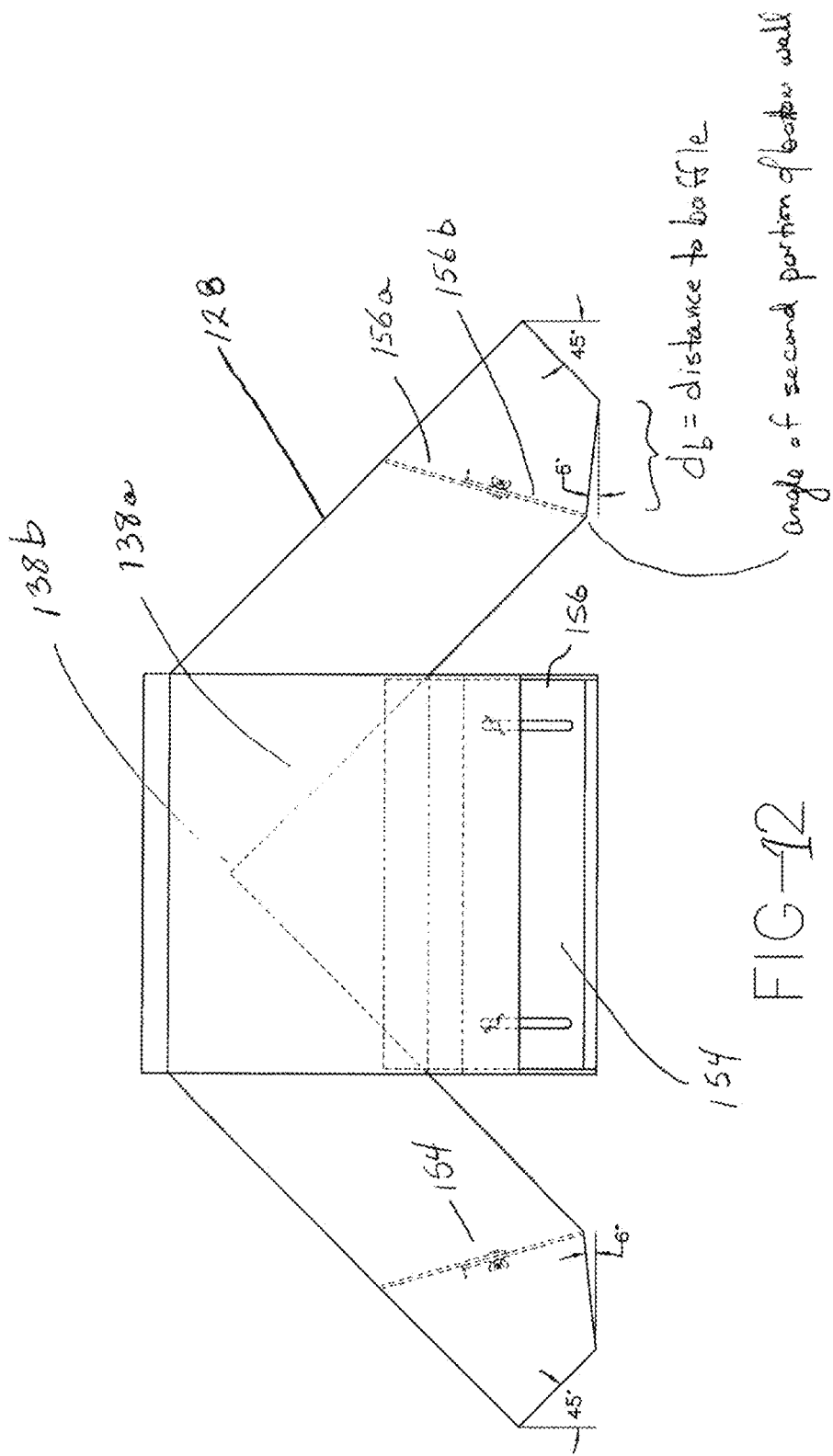
FIG. 12 is a side view with the internal structure ghosted in of a head for use with an animal feeder according to an embodiment of the present disclosure.
Figure 13:
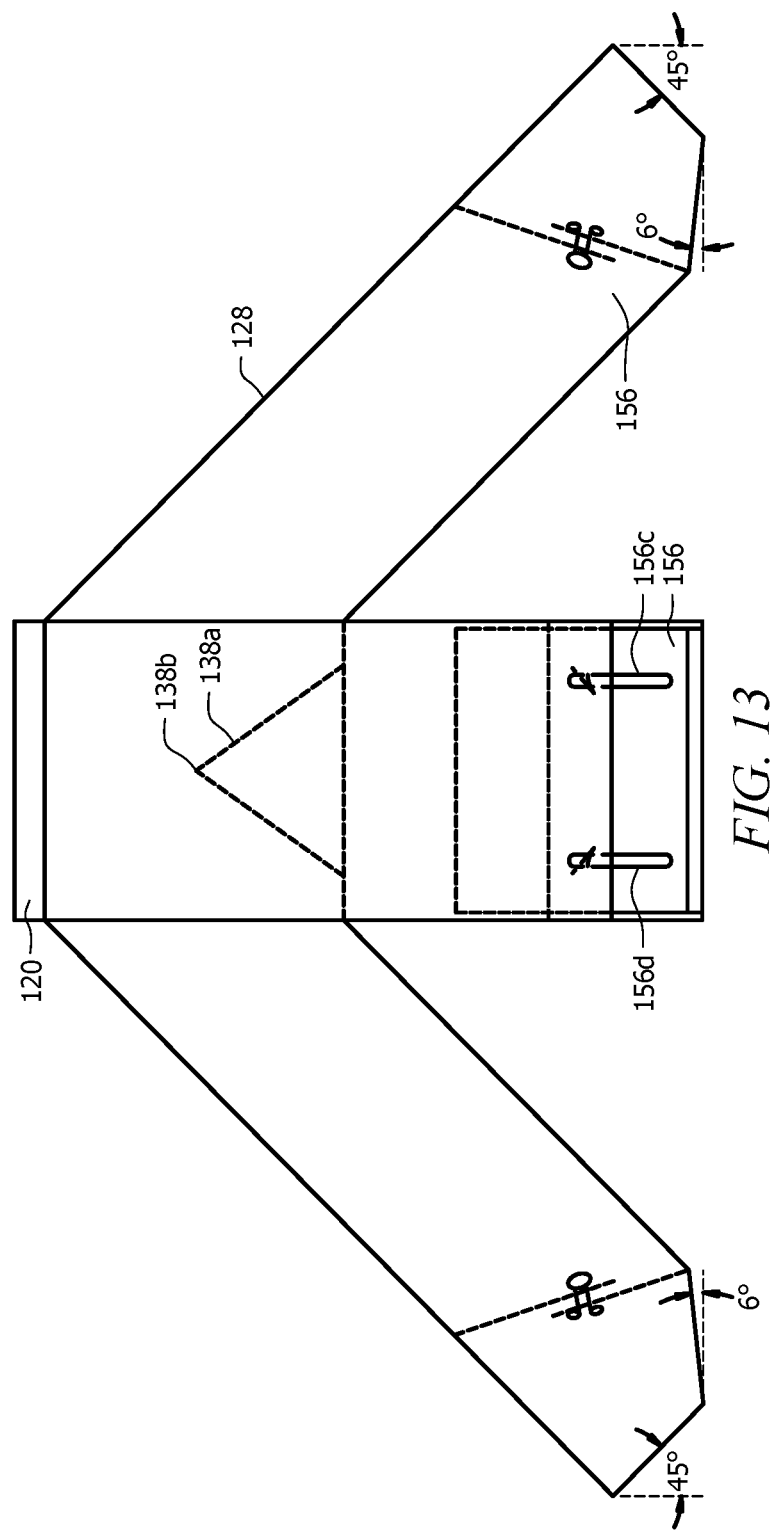
FIG. 13 is a side view with the internal structure ghosted in of a head for use with an animal feeder according to an embodiment of the present disclosure.

Adjustable baffle assembly 56 may be provided to control the size of the four feed openings 26 in the manner illustrated in FIGS. 3 and 4. For example, FIG. 4 illustrates the adjustable baffle in feed trough 32 (see side view) is almost closed and that in feed trough 30 is fully opened. Adjustable baffle assembly 56 may be comprised of fixed plate 56a with movable baffle plate 56b engaged therewith. Movable baffle plate 56b may have a pair of slots 56d through which fasteners 56c (engaged to fixed plate 56a) extend therethrough. Fasteners 56c, such as wing nuts, may be tightened to hold baffle plate 56b to fixed plate 56a once the desired opening is selected, or loosened so that lower edge 56e, defining the upper opening of feed openings 26, may be moved up or down. Alternate embodiment 110 may have adjustable baffle assembly 156 (see FIGS. 12, 12A, 13, 13A, for example). As in the earlier embodiment, fixed plate 156a (which may be mounted to the top wall), movable plate 156b, fasteners 156c, and slots 156d may be used. In one version of alternate embodiment 110, the plane of the gates and baffle assembly 156 may extend from the junction of angled-up portion 143 up to top wall 148 as seen in FIG. 12.

Adjustable baffle assembly 56 may be omitted, in which case the bottom edge of fixed plate 56a may define a fixed baffle, which may include fixed feed opening 26, the feed opening being the space between the lower edge of 56a as seen in FIG. 4 and floor 38 (trough 30). Fixed plate 56a may be integral with and may form a lower wall portion of manifold side walls—that is, manifold side walls typically extend below the point where the trough top walls 40 are attached thereto.

Turning back to FIGS. 2, 3, and 4, details of some of the structure of housing 49 may be appreciated. Lower lip 50 (element 150 in FIG. 9) may be designed both to prevent access of rain into the housing, but also to stack up particulate feed matter there behind. Moreover, it is seen with respect to FIG. 4 that a distance e may be provided, where distance e is the distance between the plane of floor 38 of head 28 and top edge 50b of lower lip 50, typically about ⅛ inch to about ¾ inch. It is typically provided that top edge 50b of lower lip 50 is below the plane of bottom wall 30a, typically at least about ⅜ inch. This may prevent the water or moisture that may accumulate behind lower lip 50 from creeping up, as by capillary action in the feed or the like, onto floor 38 and into any feed that may be resting on the floor or in the manifold.

It is further seen that lower lip 50 may be spaced back from a front edge of bottom wall 42 and the side wall front edges of housing 49. This distance d may be between about ¼ inch and about ½ inch. Spacing the lower lip back from the side wall front edges may help keep moisture out of the housing. The removed ends of lower lip 50 may include side walls 50a that may be spaced apart from adjacent feed trough side walls 44, 46 to leave a gap, a small gap, for moisture or the like that may collect behind the lip to seep out.

Likewise, upper lip 52 may extend beyond the side walls a distance of 1/16 inch to greater than one inch as designated "f" in FIG. 4. Upper lip 52 may be adapted to help keep moisture out of the housing.

Angular relationships may be appreciated with reference to FIGS. 2, 3, and 4. Angle "a" is designated as the angle between the plane of bottom wall 30a and bottom walls 42 of the feed trough and is typically designed to provide a sufficient angle to deliver particulate feed, under the impetus of gravity, to lower lip 50, but not be too steep for the particulate feed to overflow excessively. An angular range of approximately 5-45° may be provided with a preferred range of 5-20°, of the more preferred range of 12-17°, preferably approximately 15°.

Angle "b" defines an angle between axis "A" or vertical side wall of the manifold and top wall 48 of housing 49. Angle "b" should be steep enough to prevent animals, such as raccoons, from perching thereupon (and robbing feed) and be steep enough to shed water easily. Angle "b" may be suitable in the preferred range of, but not limited to, approximately 130 to 140°.

Angle "c" is the angle of cutback between the vertical axis A and the front edges of side walls 44 and 46. Such an angular cutback is preferably in the range of, but not limited to, 30 to 60°, and more preferably about 45°. This angle is preferably sufficiently large to provide, in conjunction with lip 52, sufficient overhang to keep particulate feed in housing 49 dry. On the other hand, the angle should not be so excessive that it would prevent access for the muzzle of an animal, such as a deer, to enter the mouth of housing 49, so as to obtain particulate feed therein.

Figure 6:
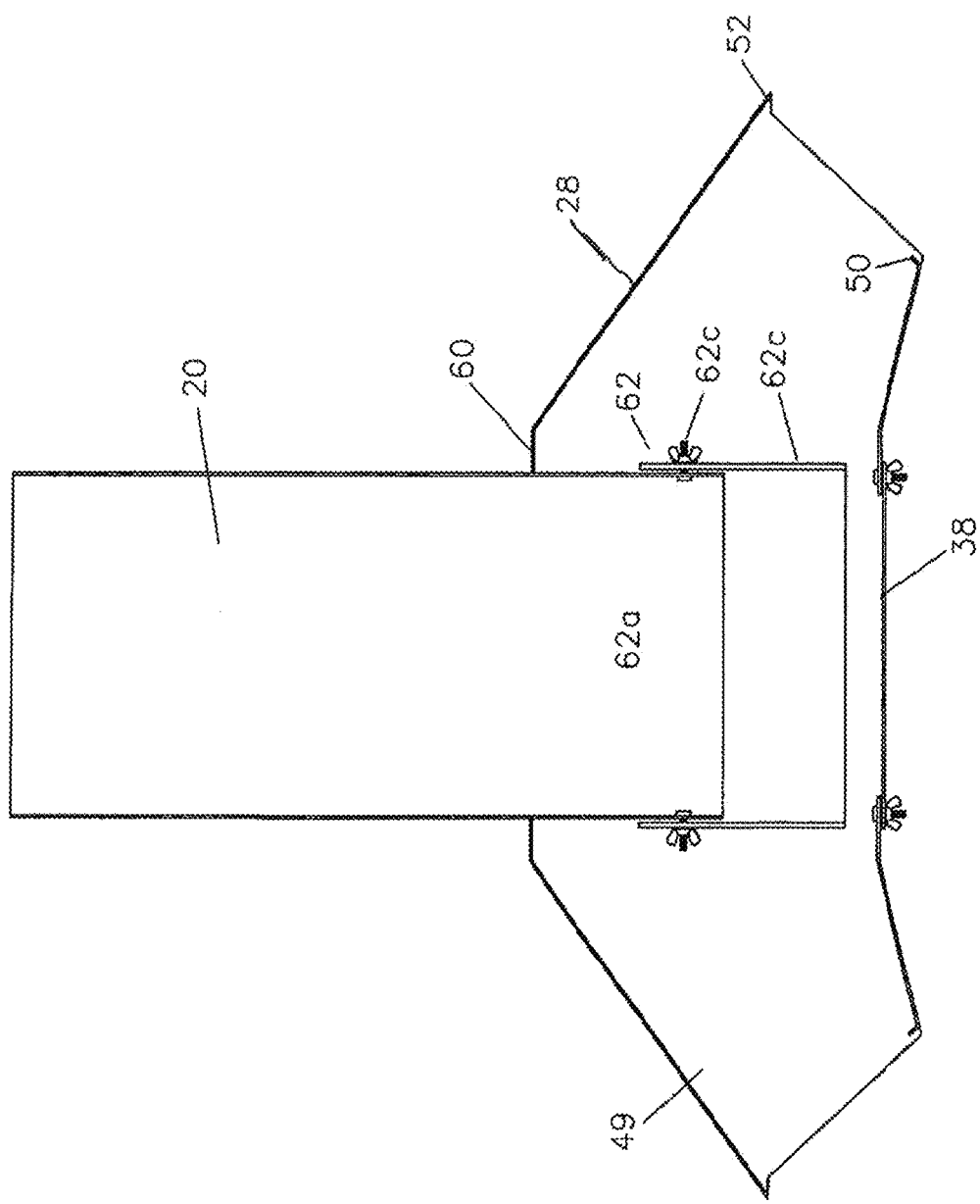
FIG. 6 illustrates a cross-sectional view of an animal feeder according to an embodiment of the present disclosure having a round manifold engaging head through the use of adapter plate.
Figure 7:
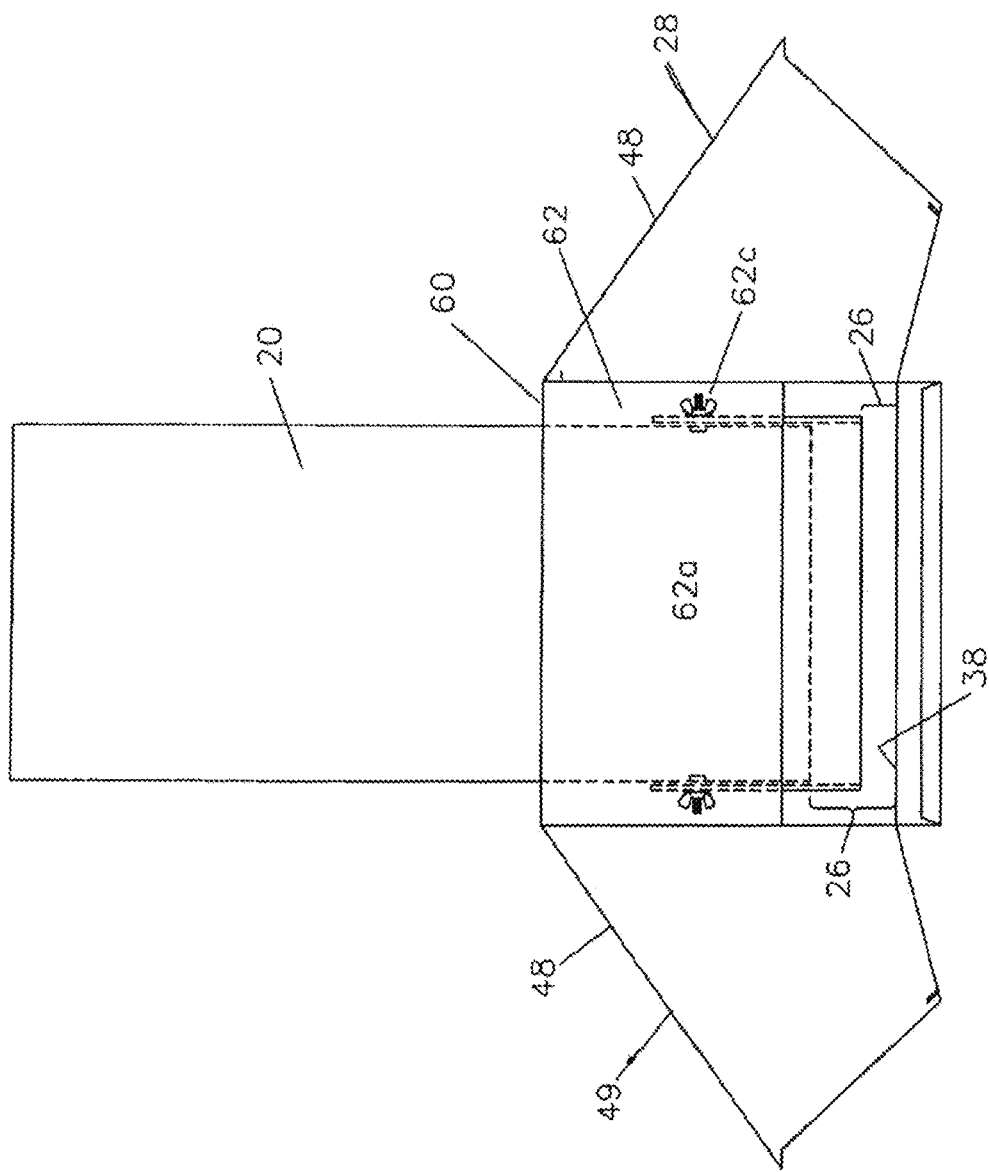
FIG. 7 is a side elevational view of the manifold and head assembly as set forth in FIG. 6.
Figure 8:
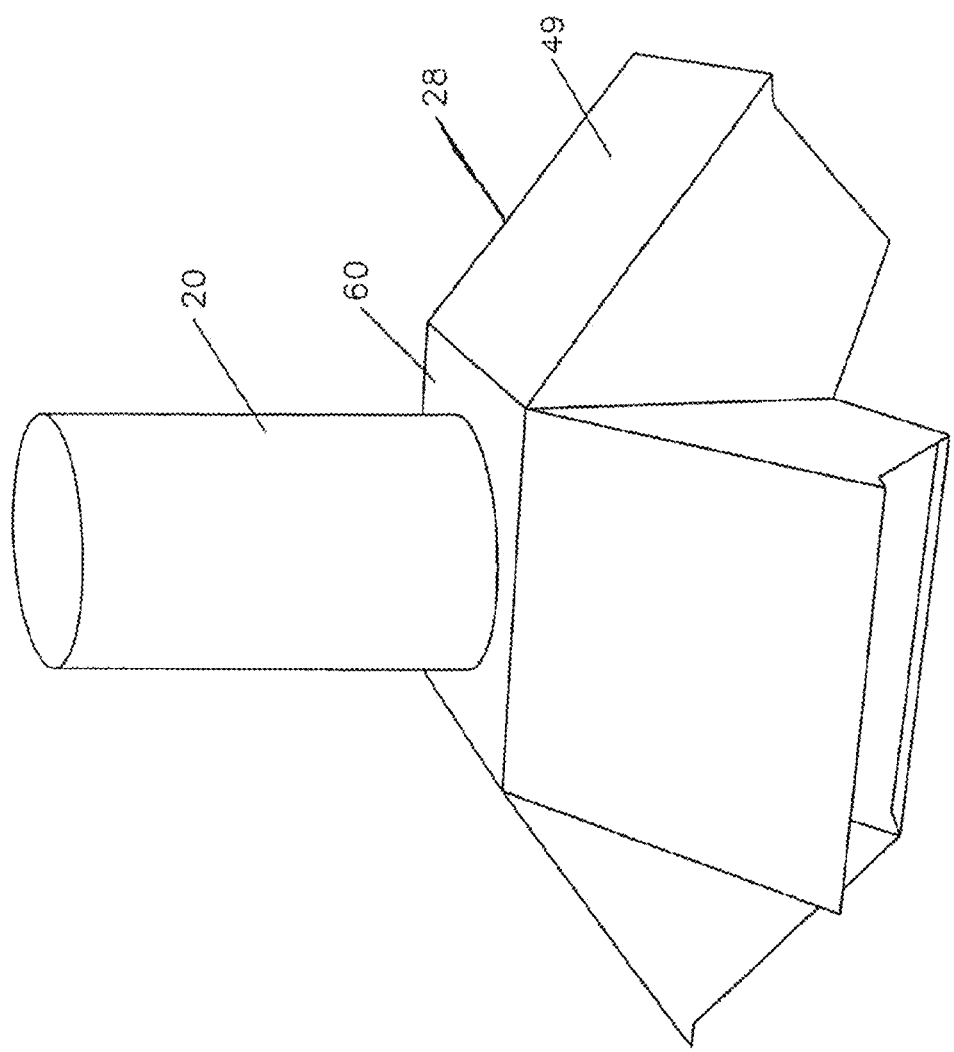
FIG. 8 is an external perspective view of the manifold and head of the embodiment set forth in FIGS. 6 and 7 above.

FIGS. 6-8 illustrate an animal feeder according to an embodiment of the present disclosure having a round (cylindrical) shaped manifold, connected through the use of adapter plate 60, which may form a part of head 28. That is to say, an adapter plate may be provided to adapt the top wall of the housing to a cylindrical rather than a rectangular shape.

Further, a cylindrical manifold may extend below the adapter plate so as to provide a single cylindrical fixed plate 62 *a* as part of adjustable baffle assembly 62 that may serve the same function as adjustable baffle assembly 56 in the embodiments illustrated in FIGS. 2, 3, and 4.

Cylindrical fixed plate 62*a* therefore may extend well below adapter plate 60 and well below top wall 48 of housings 49. Fasteners 62*c* may be provided in slots (not shown) typically two, of baffle plate 62*b*, the two slots being approximately 180° apart. Fasteners 62*c* may be mounted to cylindrical fixed plate 62*a* and extend through the slots so a wing nut or the like of fasteners 62*c* may be tightened down when the desired height of manifold feed opening 26 is reached. Two such heights are illustrated in FIG. 7 as manifold feed openings 26. Moreover, if adjustable baffle assembly 62 is not used, the bottom edge of cylindrical fixed plate 62*a* may act as a fixed baffle and deliver feed to floor 38. Pressure of the particulate feed may work the feed into housings 49. As an animal eats the particulate feed out of the lower end of the housing, more will flow from the hopper through the manifold to the floor and through manifold feed opening 26 (whether fixed or adjustable).

FIGS. 9-16 illustrate an animal feeder 110 with some similarities to the feeder illustrated in FIGS. 1-8, and some differences. Wildlife feeder 110 may include hopper 112 adapted to receive particulate feed and typically supported above the ground on legs 113*a*/113*b*/113*c*/113*d* or on a trailer, skid or other suitable structure. Head 128 having a multiplicity of feed troughs 130/132/134/136 may be provided. Head 128 may directly engage hopper 112 as seen in FIGS. 9, 16, 17A, 17B, 18A, and 18B, or may engage hopper 112 indirectly, through the use of manifold 120, which will direct the particulate feed matter from the interior of the hopper to feed openings 126 of the feed troughs of head 128.

Feeder 110 may include floor 138, which is that portion of head 128 that is below manifold 120 or other opening engaging the hopper and directing feed from the bottom of the hopper to the feed troughs. Floor 138 may be flat or may have a pyramid or cone portion 138*a* with a point 138*b* (or may be a combination of the two), which point may be centered along a longitudinal axis running through the manifold or other opening, which axis runs through the slanted bottom walls 114*a*/114*b*. This axis generally defines the gravitationally induced by particulate feed flow and it represents, in one embodiment, the confluence of the four bottom walls of the hopper.

FIGS. 9A, 10, 11, and 12 illustrate bottom wall 142 of the feed troughs, which bottom wall 142 includes, in one embodiment, upper portion 148*a* and angled-up or tray portion 143, which is typically non-parallel with the top wall. Wall upper portion 142*a* may be substantially parallel to top wall 148 and may be separated by parallel side walls 144/146. However, near the removed end of the feed trough, bottom wall 142 breaks sharply and angles up as seen, for example, in FIG. 11, thereby comprising angled or tray portion 143, here seen to be almost horizontal and, in one embodiment, making an angle down of about 6° with the horizontal, preferably in a range of 2-12°. Angled or tray portion 143 may extend back a distance Db from the front edge of the mouth, as seen in FIG. 12, which distance is preferably about 12 inches and may be in the range of about 6 to about 18 inches. Careful observation and experimentation has determined that these dimensions allow an animal's snout (not shown) to reach in sufficiently to receive particulate food matter that may fall back from the mouth.

In an embodiment of the present disclosure, baffle assembly 156 may be provided, which baffle assembly may be located in the feed trough between feed opening 126 and mouth 122, where the break between upper portion 142*a* and angled-up or tray portion 143 occurs. As in previous embodiments, baffle assembly may comprise fixed plate 156*a* engaging the top and/or side walls and movable plate 156*b* engaging the fixed plate and configured to ride up and down on a pair or more fasteners 156*c* on slots 156*d* in movable plate 156*b*, so as to adjustably open an opening in the feed troughs by which particulate matter being carried under the impetus of gravity along the bottom wall of the feed troughs can pass therethrough to the mouth. Fasteners 156 *c* may include wing nuts facing mouth 122.

Figure 11:
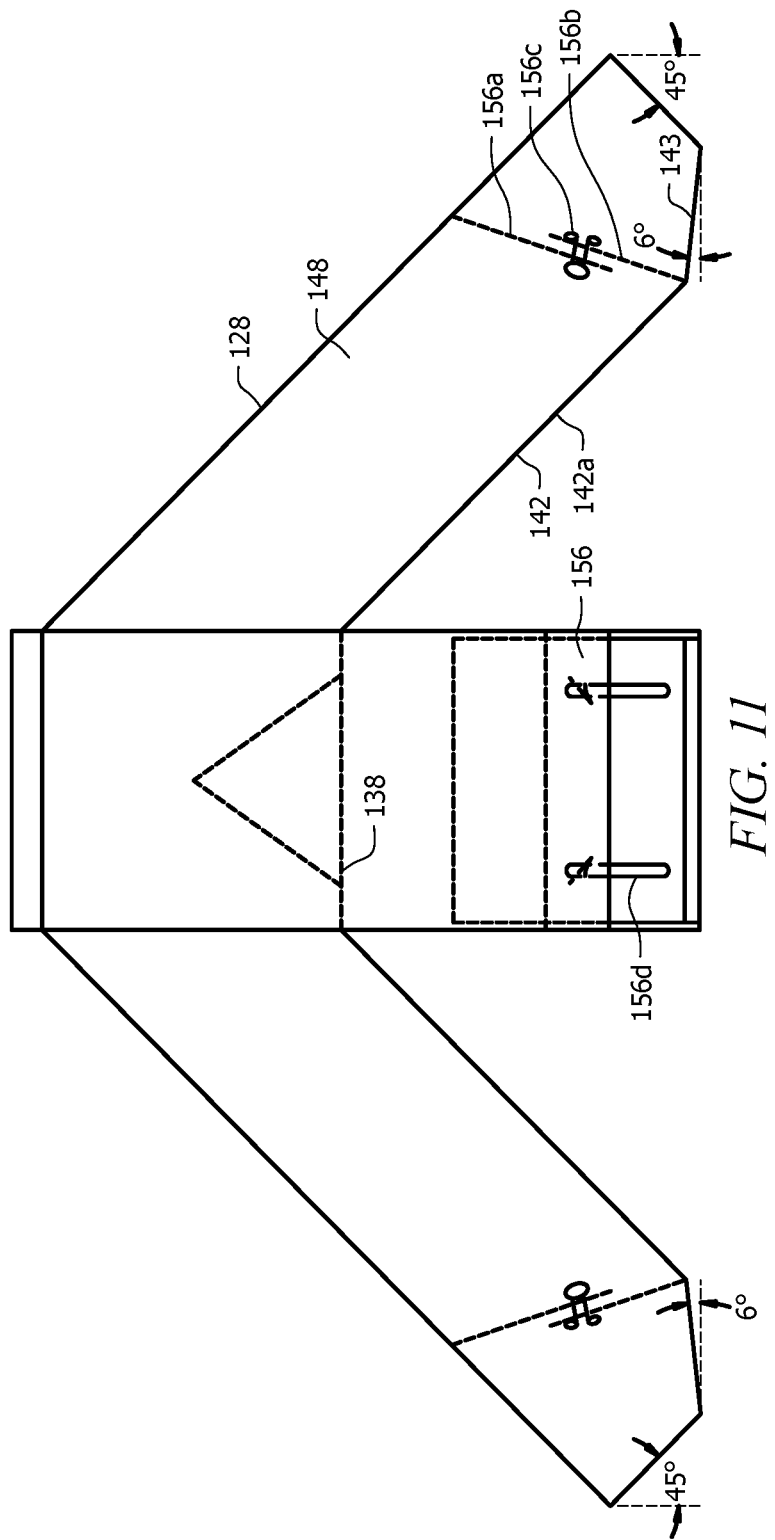
FIG. 11 is a side view with the internal structure ghosted in of a head for use with an animal feeder according to an embodiment of the present disclosure.

Floor 138 may include cleanout plate 140 with fasteners 140*a* engaged therewith. In one embodiment, pyramid or cone portion 138*a* may have a flat perimeter portion as seen in FIG. 11. In FIG. 12, floor 138 is seen to comprise just pyramid or cone portion 138*a*, which side walls (four for the pyramid, see FIG. 15A) continue straight into the bottom walls of the feed troughs. Compare FIG. 14A to FIG. 11, for example. (See also FIG. 15.)

Figure 9:
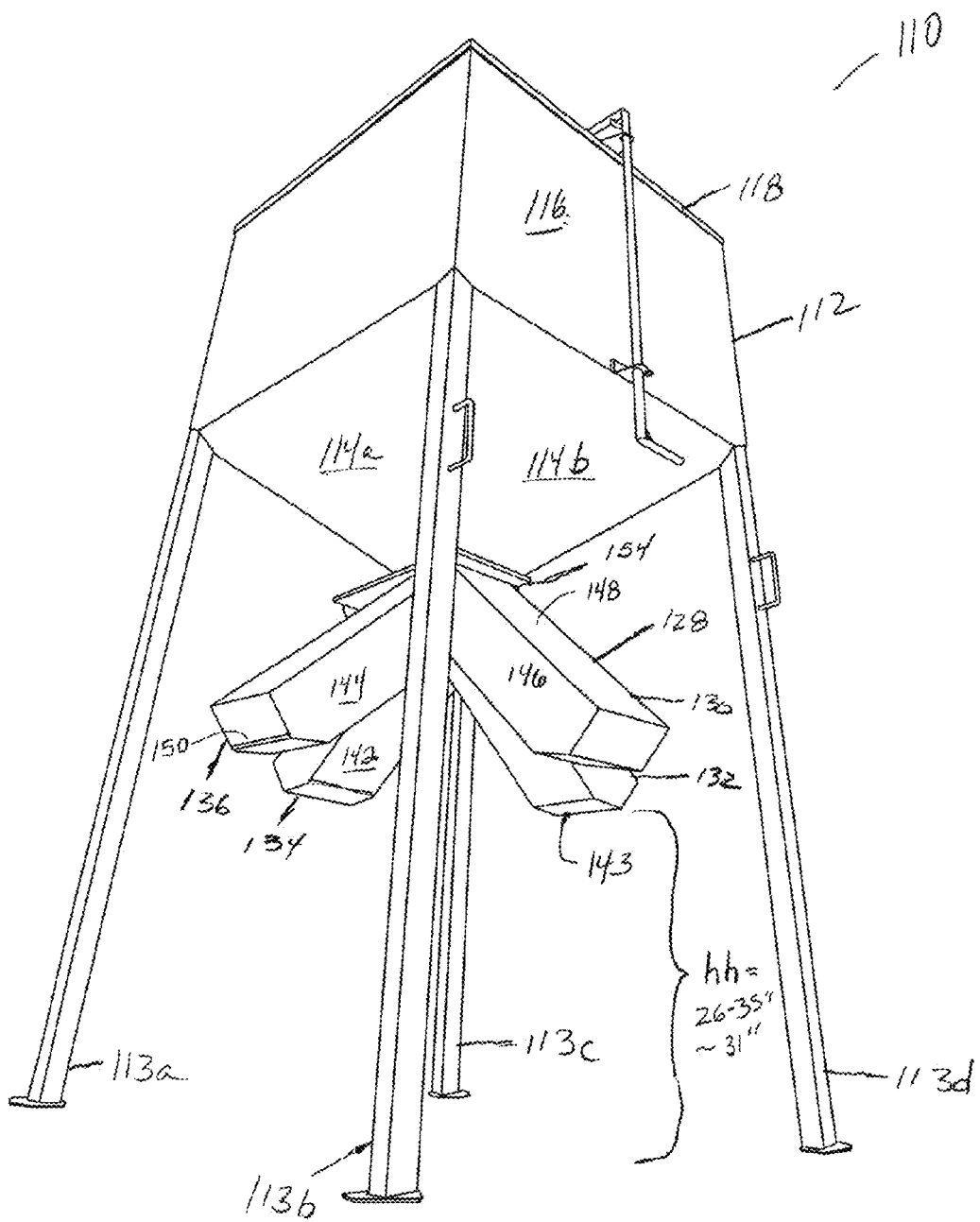
FIG. 9 is a perspective exterior view of an animal feeder according to an embodiment of the present disclosure.

FIG. 9 illustrates that the lower edge of the mouth may be positioned above the support surface a distance Hh, that may be about 31 inches or in a range of about 26 to 35 inches, and preferably less than about 41 inches above the support surface. Careful observation and experimentation has shown this preferred height and these ranges to be preferable for feeding for certain animals, including non-wildlife (domestic), such as cattle. By carefully controlling and positioning the height, this encourages cattle to feed and discourages varmints or rodents from having access to the feed troughs.

Figure 16:
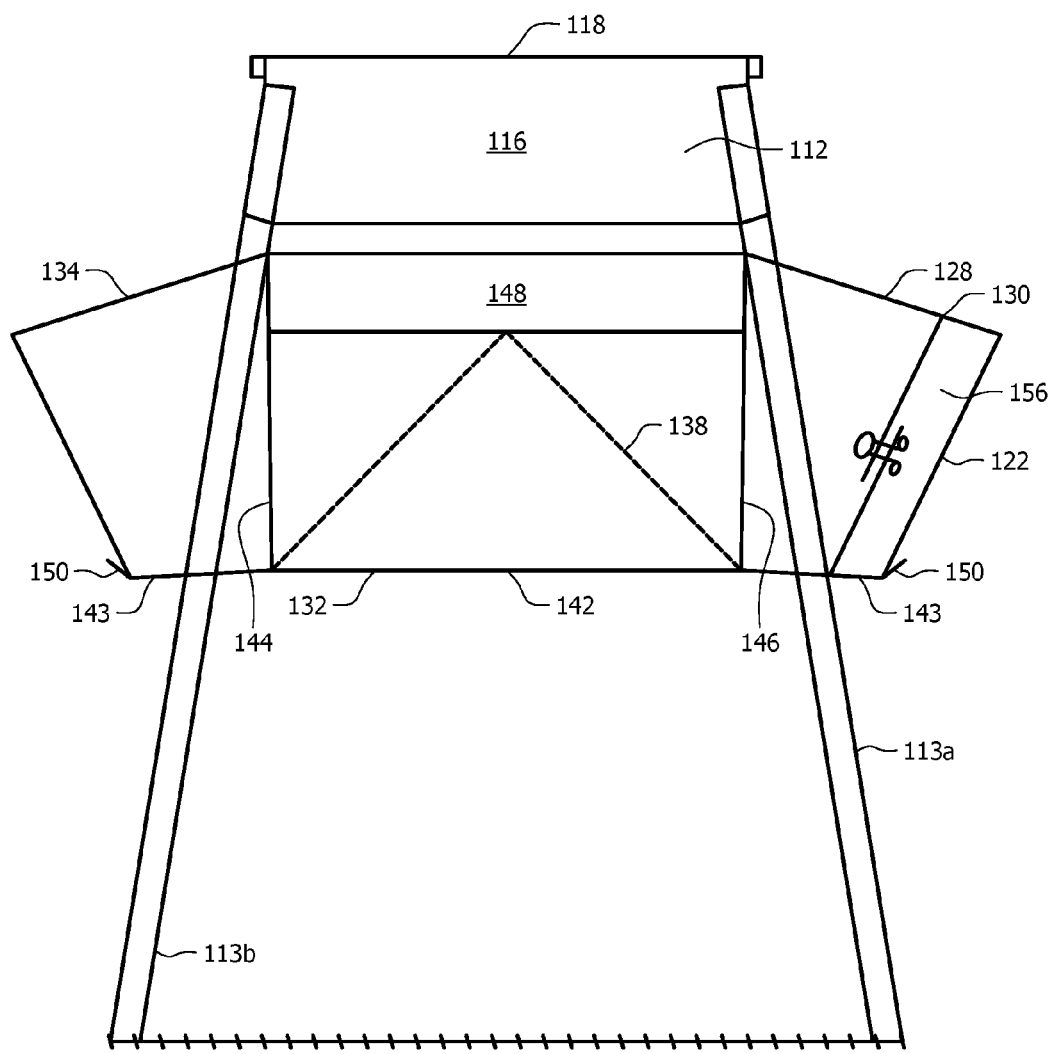
FIG. 16 is a side view of an alternate embodiment of an animal feeder according to an embodiment of the present disclosure.

FIG. 16 illustrates another embodiment of wildlife feeder 110 in which feed troughs of head 128 directly engage side walls 116 of hopper 112, such that floor 138 of head 128 may act as a floor of the hopper, which has no bottom walls, and baffle assemblies 156 may be used to control the feed flow from the hopper to the mouth of the feed troughs. In any of the embodiments illustrated, gate assembly 154 may be used between the head and the hopper and may be part of the manifold, if used.

Figure 17A:
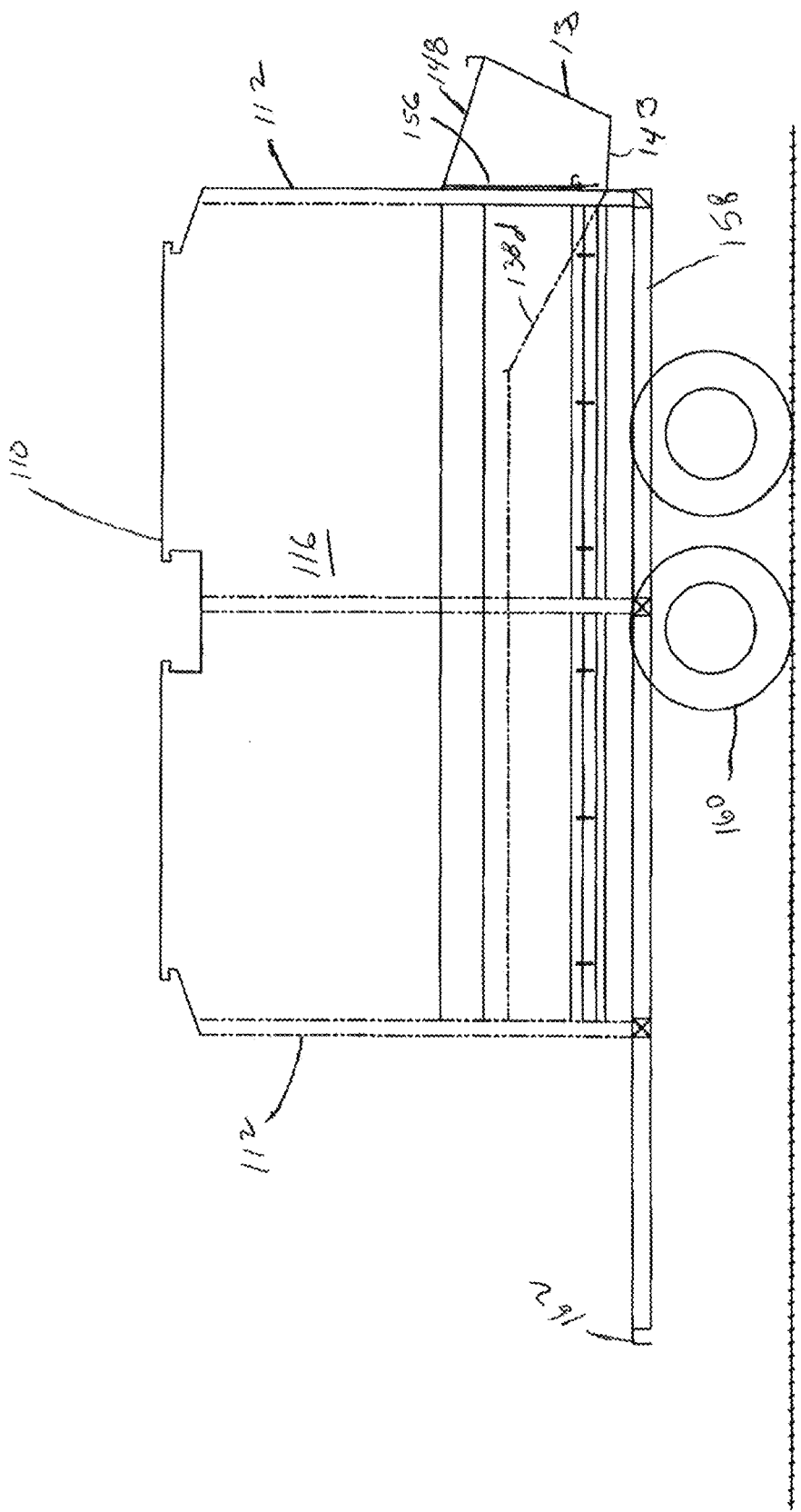

In FIGS. 16, 17A, 17B, 18A, and 18B it is seen that the top wall and the bottom walls of the trough may be non-parallel and that the bottom wall may not contain a parallel first portion like the previous embodiments, only a non-parallel portion or tray portion 143. FIG. 17A illustrates that embodiment 110, similar to that in FIG. 16 or in any of the earlier figures, may be mounted to trailer 158 having wheels 160 and hitch 162 of some sort. Hopper 112 may be mounted directly or indirectly to a frame of the trailer and side walls 116 may have head 128 directly engaged therewith. In one embodiment, this may include three feed troughs 130/132/134, one directed off the rear of the trailer and two directed off the two sides of the trailer. The trailer may be hitched to a tow vehicle, taken to a feed store where the hopper is loaded up with feed. It may then be pulled by the tow vehicle directly into a pasture or other location where animal life, including cattle, may feed directly from the trailer borne hopper and head assembly. In an alternate embodiment, instead of the trailer, skid 163 may be provided (FIGS. 18A and 18B).

FIGS. 17A, 17B, 18A, and 18B illustrate the use of floor 138 comprising an elongated pyramid wherein, instead of a point (in three dimensions), there is wedge-shaped section 138*c* directly beneath part of the hopper; it also functions as the bottom wall of the hopper (and the floor of the head) to push particulate feed to two side heads 132/134 and slanted portion 138*d* that may urge particulate feed directly to the rear head, here designated with element 130. The wedge is intended to be included in the term "pyramid," and the point may be a two-dimensional point and thus cover the wedge shape as seen in FIGS. 17A and 17B. Baffle assemblies 156 may be in the feed openings (as seen in FIGS. 17A and 17B) or anywhere else in the feed troughs.

It is seen in FIGS. 16, 17A, 17B, 18A, and 18B, that the top and bottom walls of the trough are not parallel and the bottom wall contains only tray portion 143 with the dimensions set forth hereinabove. Floor 138 may act as the floor or base for the hopper instead of the hopper bottom wall configuration in FIGS. 1-16. While the floor here is part of the head, it also may act as a floor of the hopper as it will support grain held in the hopper.

Feed, such as protein pellets, may have a tendency to create a lot of dust when placed within a feeder, particularly when being dispersed on a timed basis from an electronically operated feeder having a motor and spinner plate. Dust can build up at the mouth of the opening where the animals feed at the feeder, affecting what the animals consume. Over time (perhaps over days/weeks depending on how much protein flows through the feeder and is consumed by animals), the dust can build up so much that it can affect the ability of the feed to freely flow to the opening so that animals can access the feed. Embodiments of the present disclosure may incorporate a perforated bottom on the feeder tray that may allow the dust to separate from the feed and then fall out of the feed tube, thereby keeping the feeder flowing free of debris and other build-up that can occur when the dust collects. By incorporating a perforated head in a feeder according to embodiments of the present disclosure, the feeder may be provided with a filtering system that may allow dust from the feed to fall away from the feed.

Feed that may be used in feeders according to embodiments of the present disclosure may include a great deal of protein. Protein typically has a very low tolerance to moisture. Through inclusion of perforations in the head, water may flow out of the feed tubes away from the feed tray. Even when there is significant rain accompanied by wind, the perforated head may allow water build-up to flow through the feed tray and the condensation may dry up as there may be constant air flow through the feed due to the perforations in the head. Inclusion of these perforations may keep the feed dry and fresh and may minimize feed that may be wasted due to moisture. By having a perforated head, the feed placed in the feeder may stay dry and it also may allow for fine dust that comes off of the feed to fall through the perforations and not clog up the feeder.

Figure 19A:
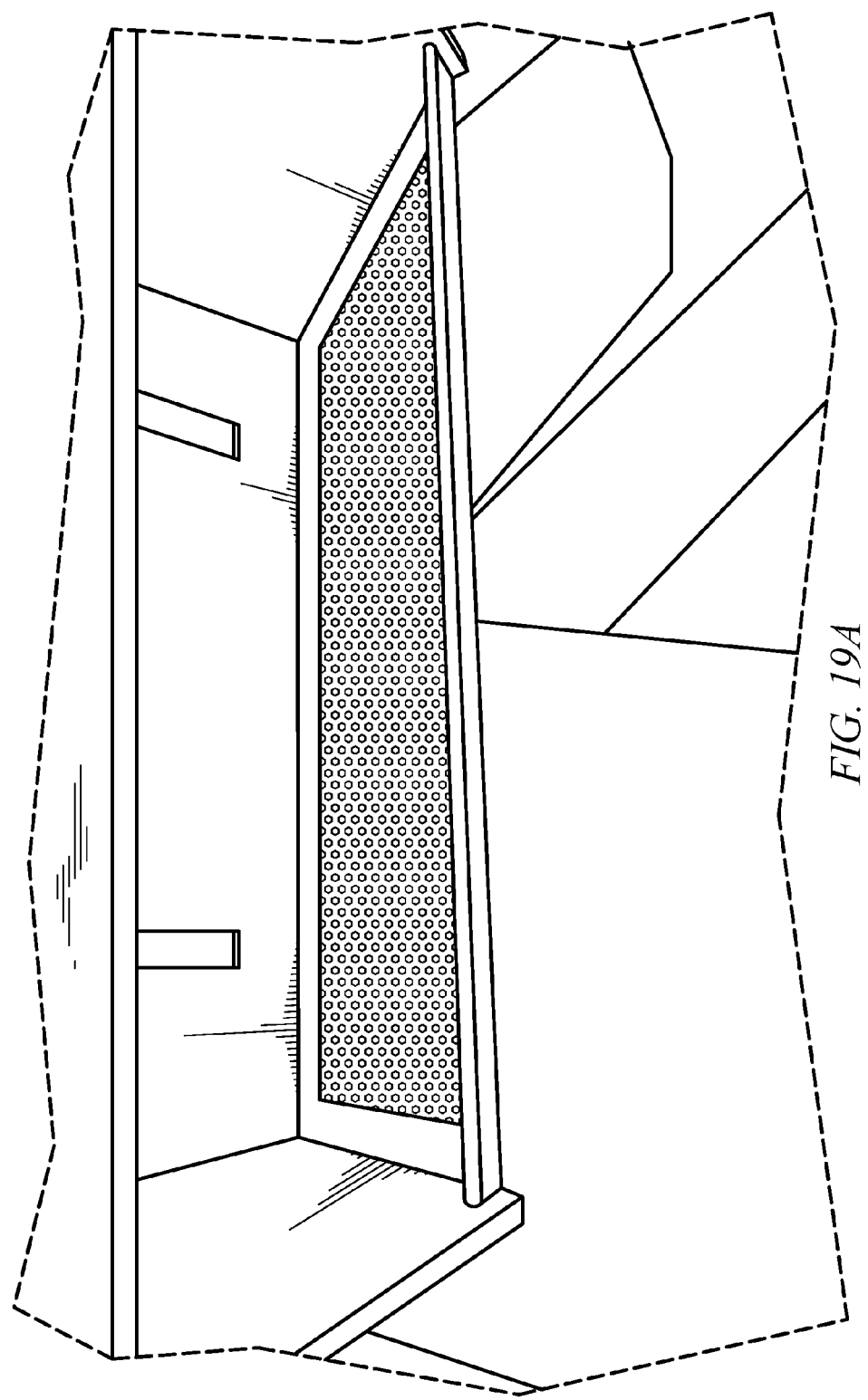
FIGS. 19A, 19B and 19C depict the perforated head of a feeder from different angles according to an embodiment of the present disclosure.
Figure 19B:
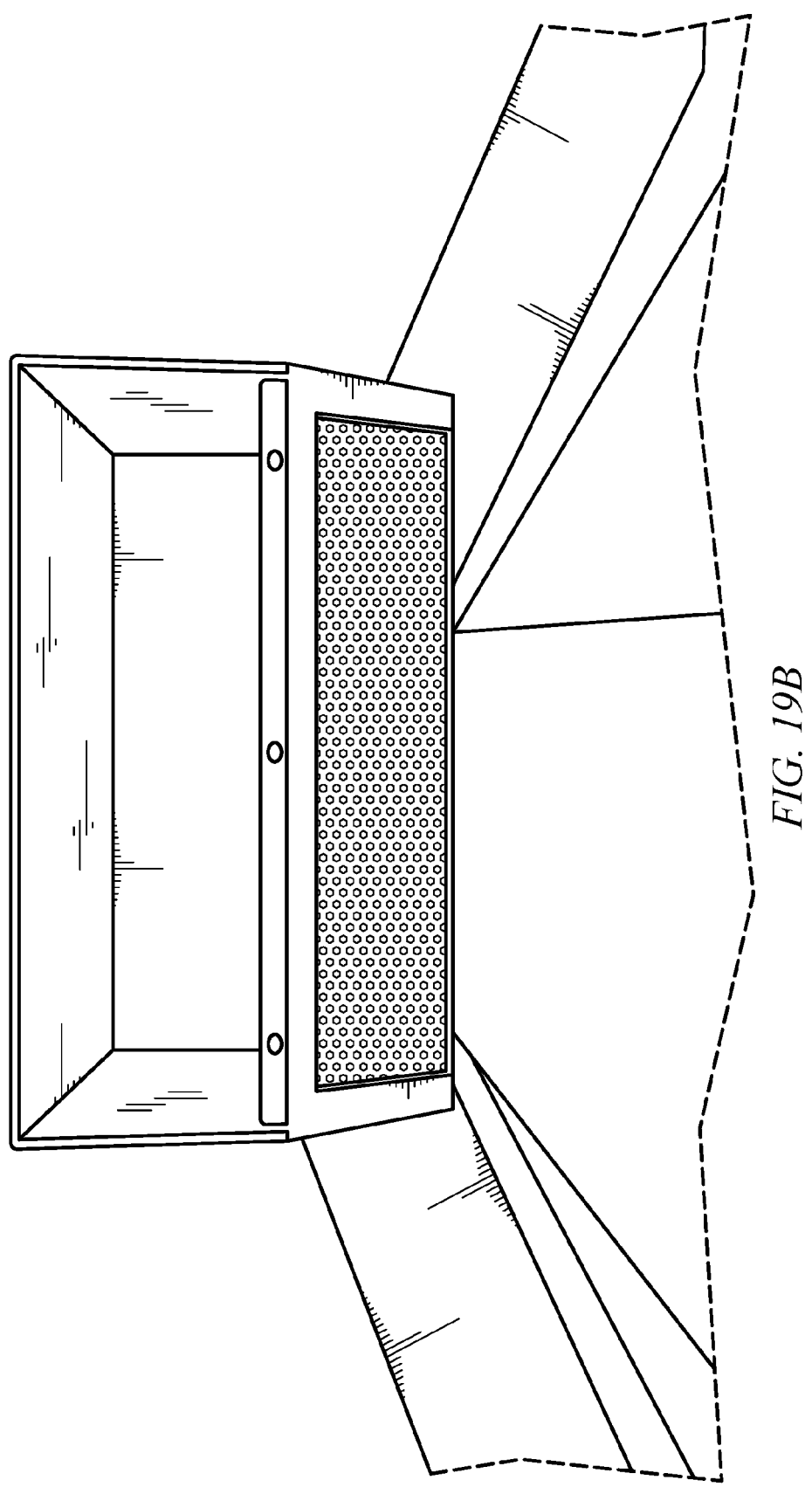
Figure 19C:
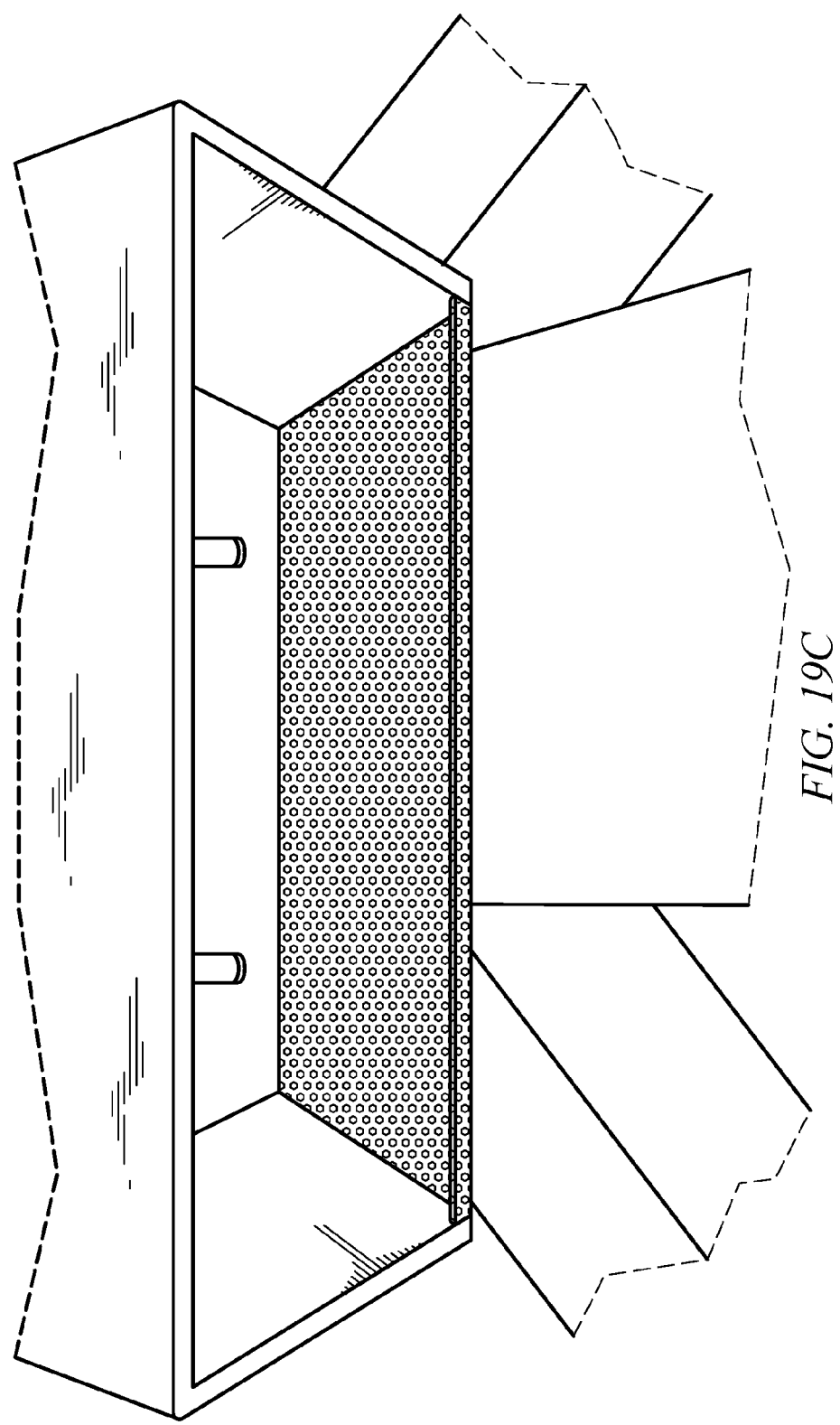
Figure 20A:
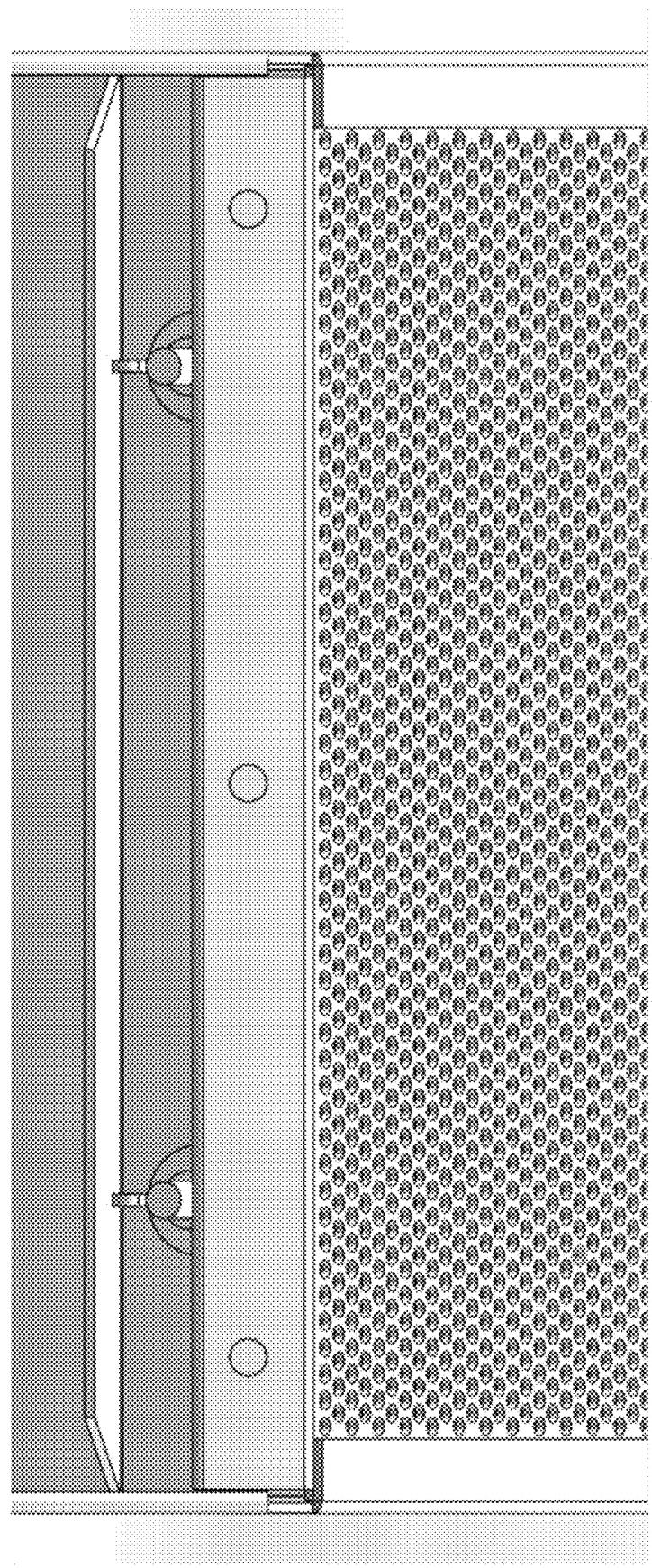
FIGS. 20A, 20B and 20C depict close-up views of a perforated head of a feeder according to an embodiment of the present disclosure.
Figure 20B:
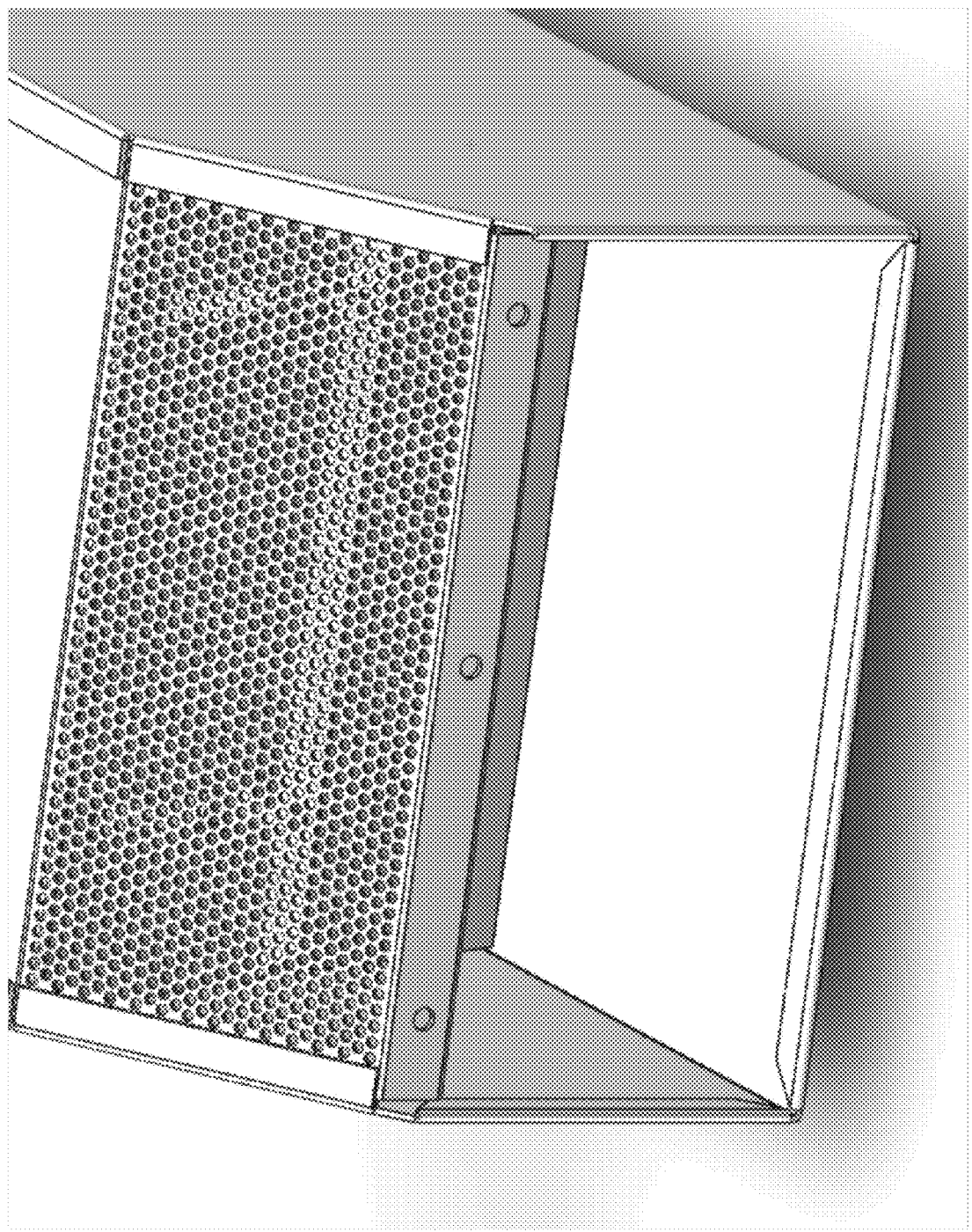
Figure 20C:
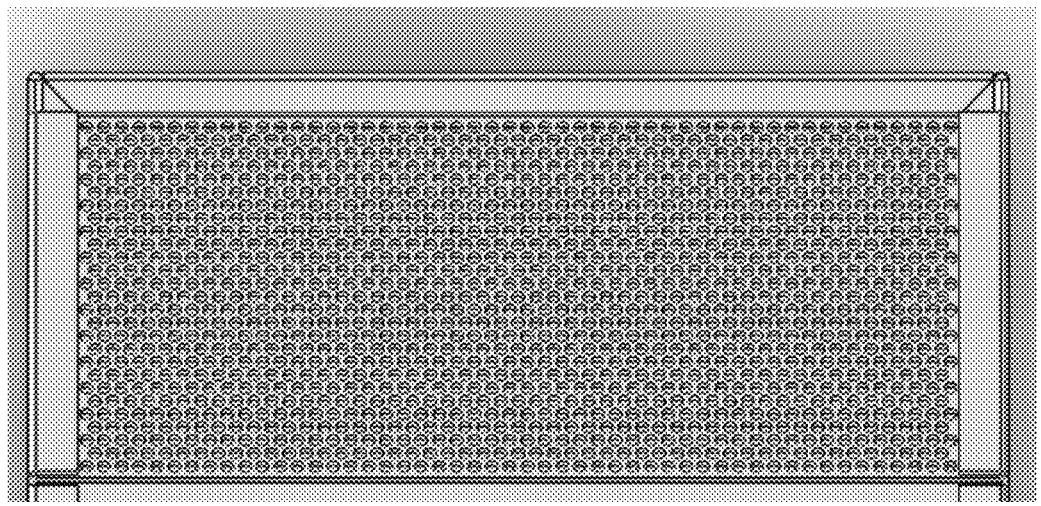
Figure 21:
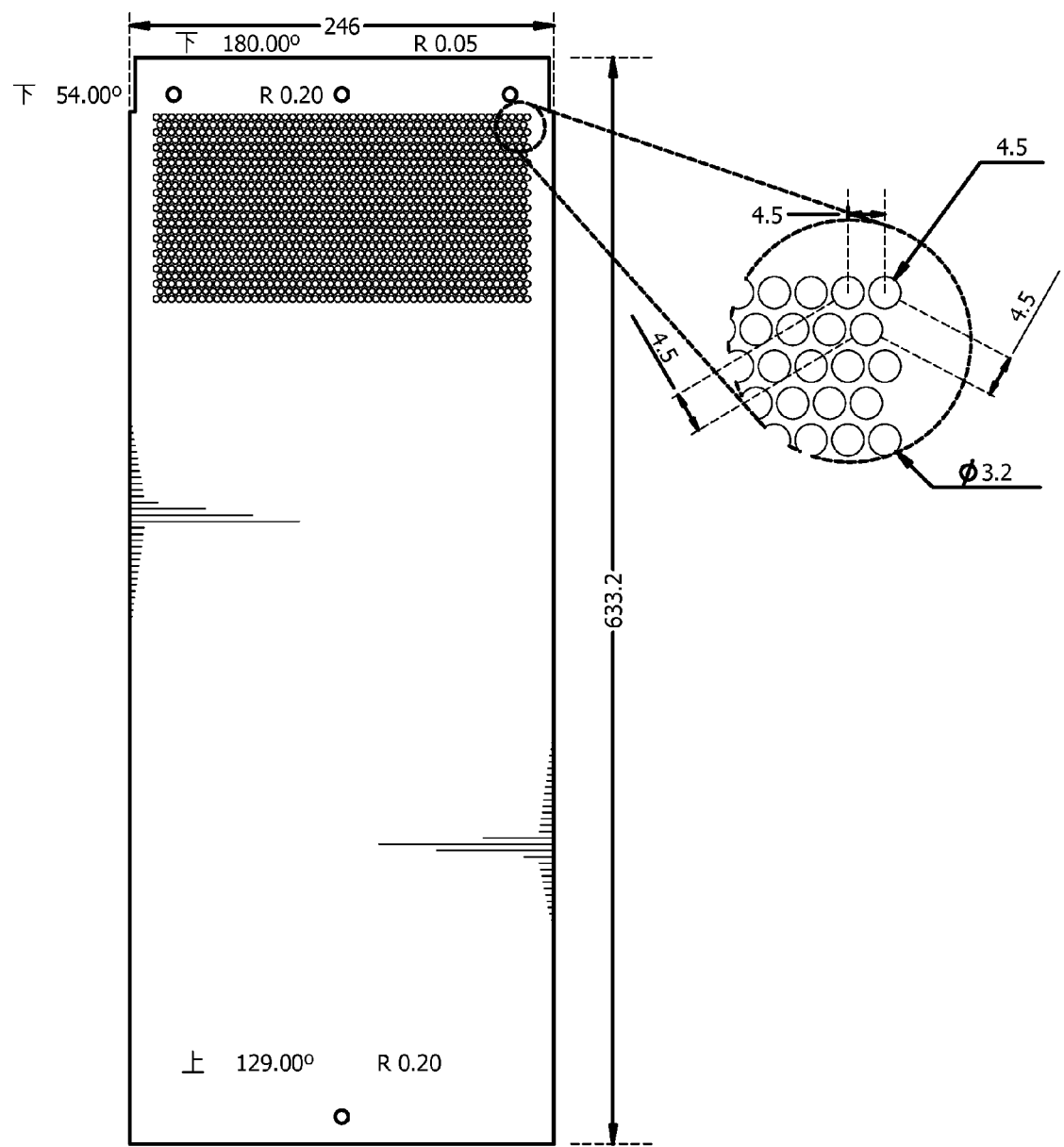
FIGS. 21 and 22A-G depict alternative views of a perforated head of a feeder according to an embodiment of the present disclosure.
Figure 22A:
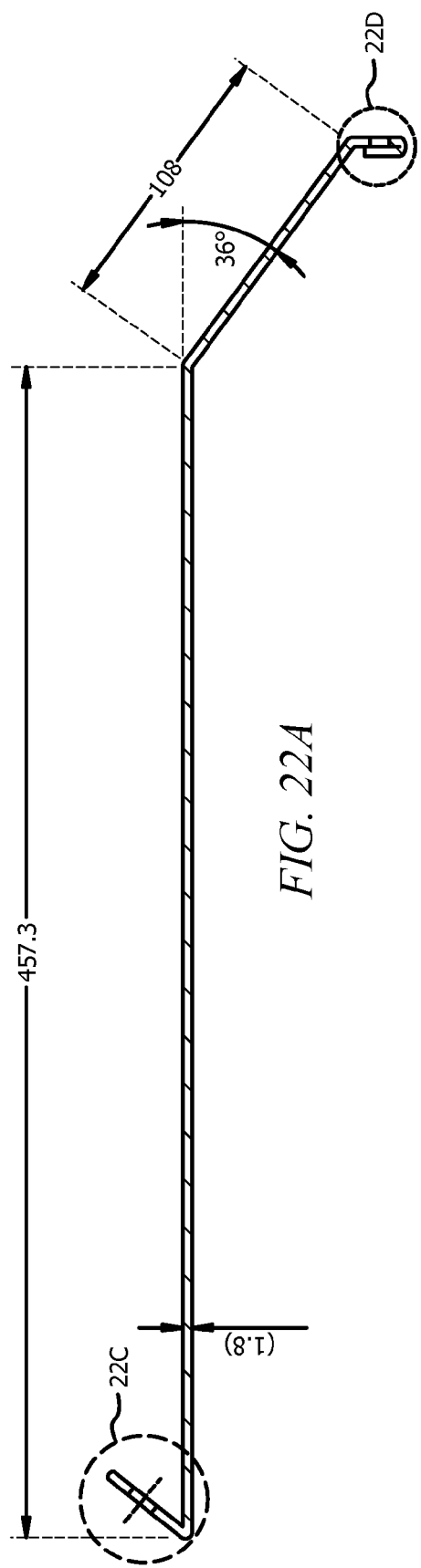
Figure 22B:
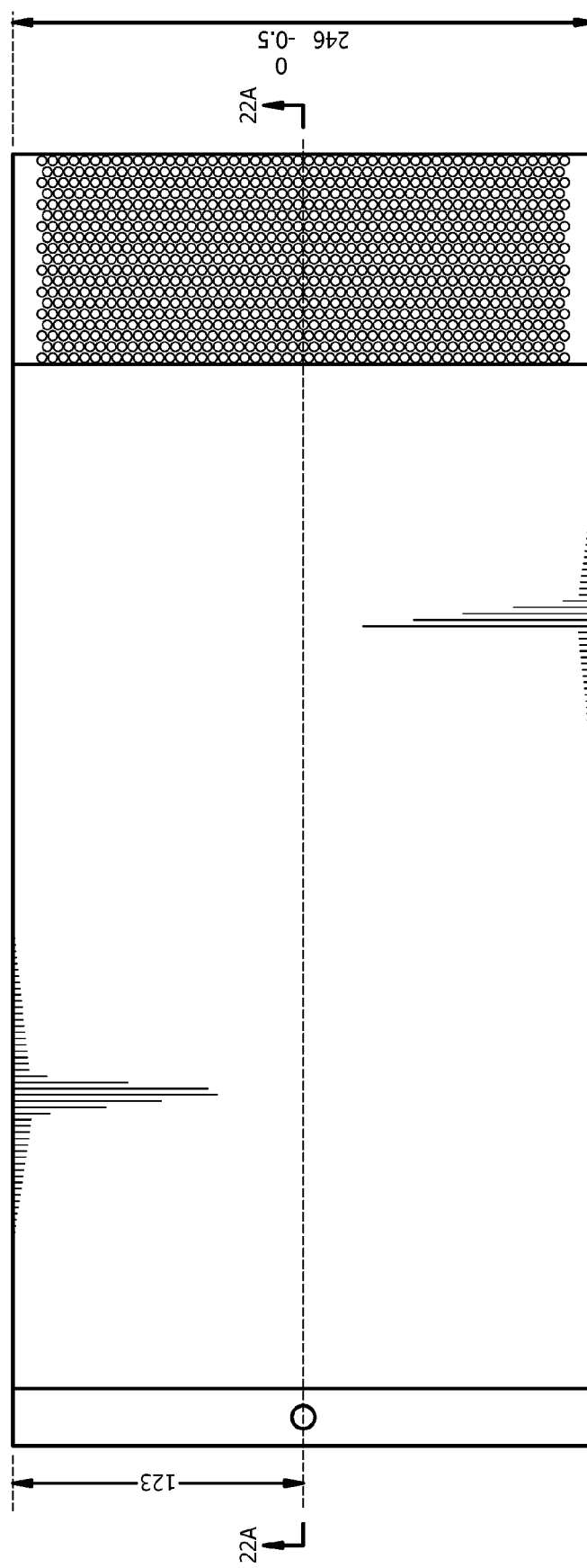
Figure 22C:
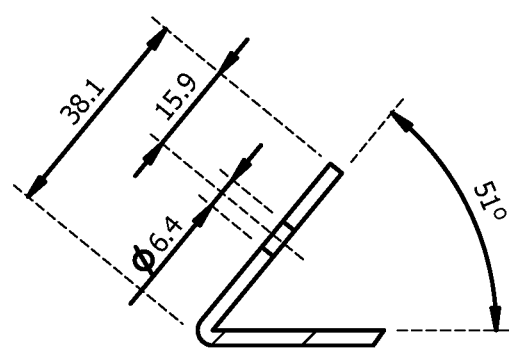
Figure 22D:
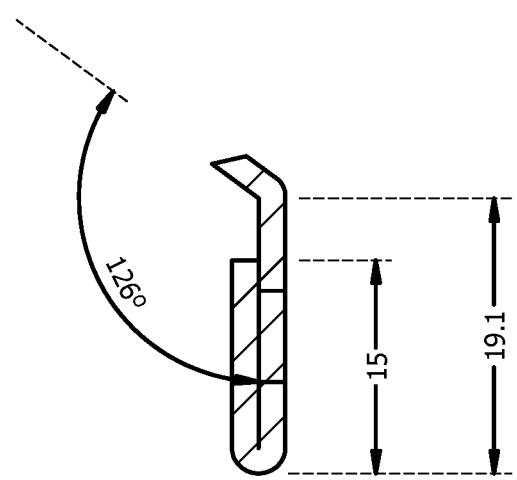
Figure 22E:
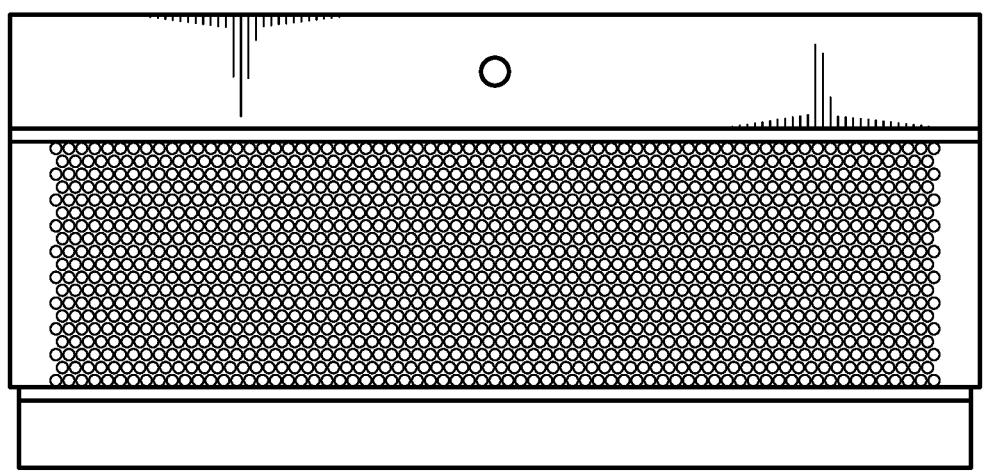
Figure 22F:
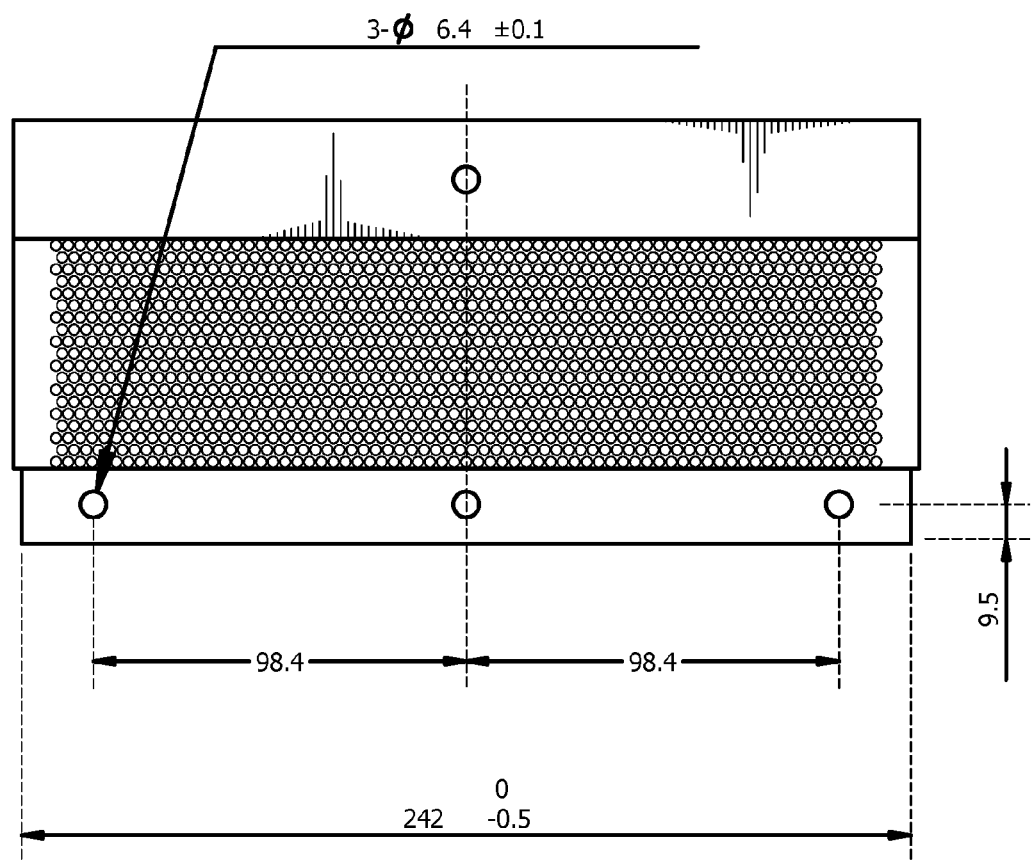
Figure 22G:
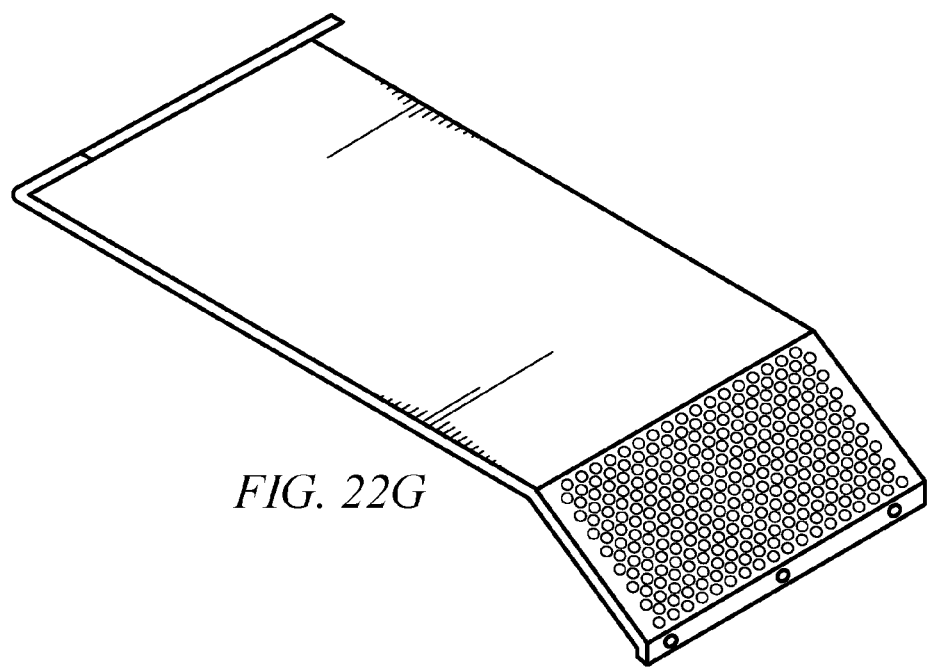

FIGS. 19A, 19B and 19C depict the perforated head of a feeder from different angles according to an embodiment of the present disclosure. FIGS. 20A, 20B and 20C depict close-up views of a perforated head of a feeder according to an embodiment of the present disclosure. FIGS. 21 and 22A-G depict alternative views of a perforated head of a feeder according to an embodiment of the present disclosure. As depicted in these Figures, the perforations may be formed from a metal or other rigid material where holes may be formed within the material. It should be appreciated that the piece of perforated material may be approximately 9 inches wide with approximately 4 inches of perforated landing; however it should also be appreciated that the size of the perforated material may be larger or smaller depending on the size of the head being employed. Also, FIG. 21 depicts the diameter of the individual perforations and the spacing between perforations according to an embodiment of the present disclosure. FIGS. 22A-G also depict dimensions and angles of positioning of the perforated material relative to a head of the feeder according to an embodiment of the present disclosure.

In some embodiments of the present disclosure, the perforated material may be integrally formed with the head of the feeder, for example, by having the perforations stamped into the bottom metal structure of the head. However, there may be other embodiments where the perforated material may be releasably attached/secured to the head. There may be further embodiments of the present disclosure wherein the perforated material may be welded or otherwise permanently attached to the head.

Figure 9A:
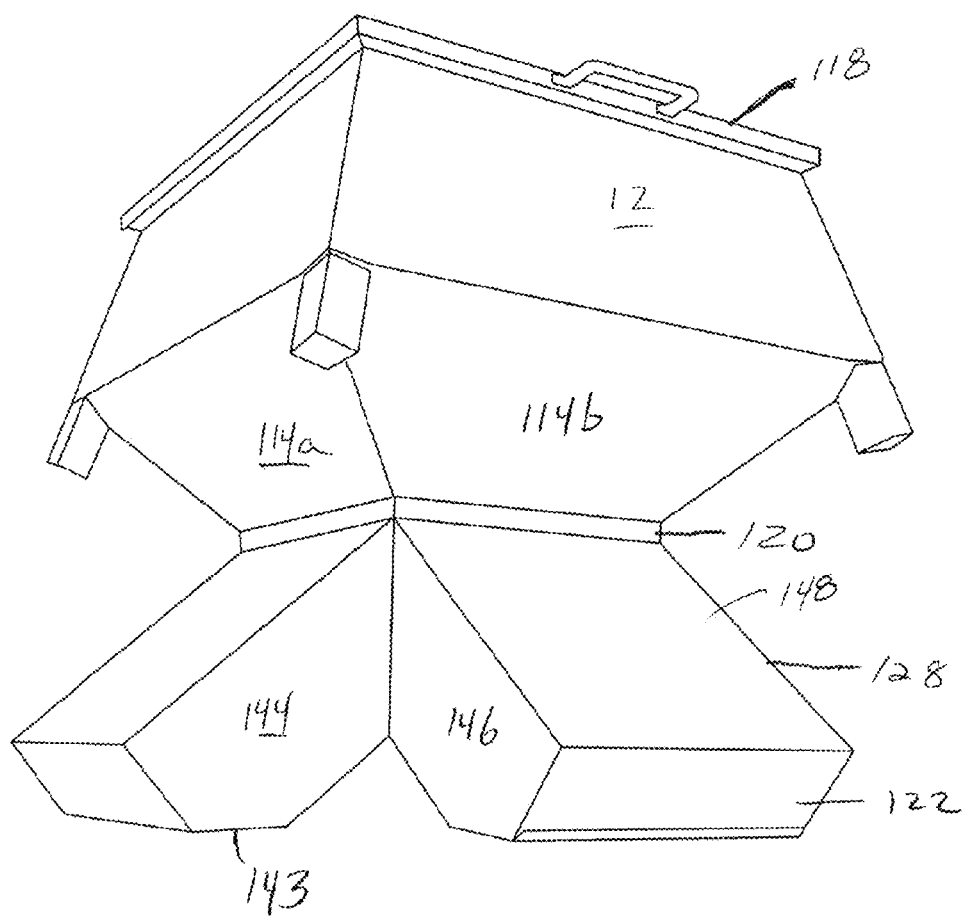
FIG. 9A is a perspective partial view of the hopper and head of an animal feeder according to an embodiment of the present disclosure.
Figure 10:
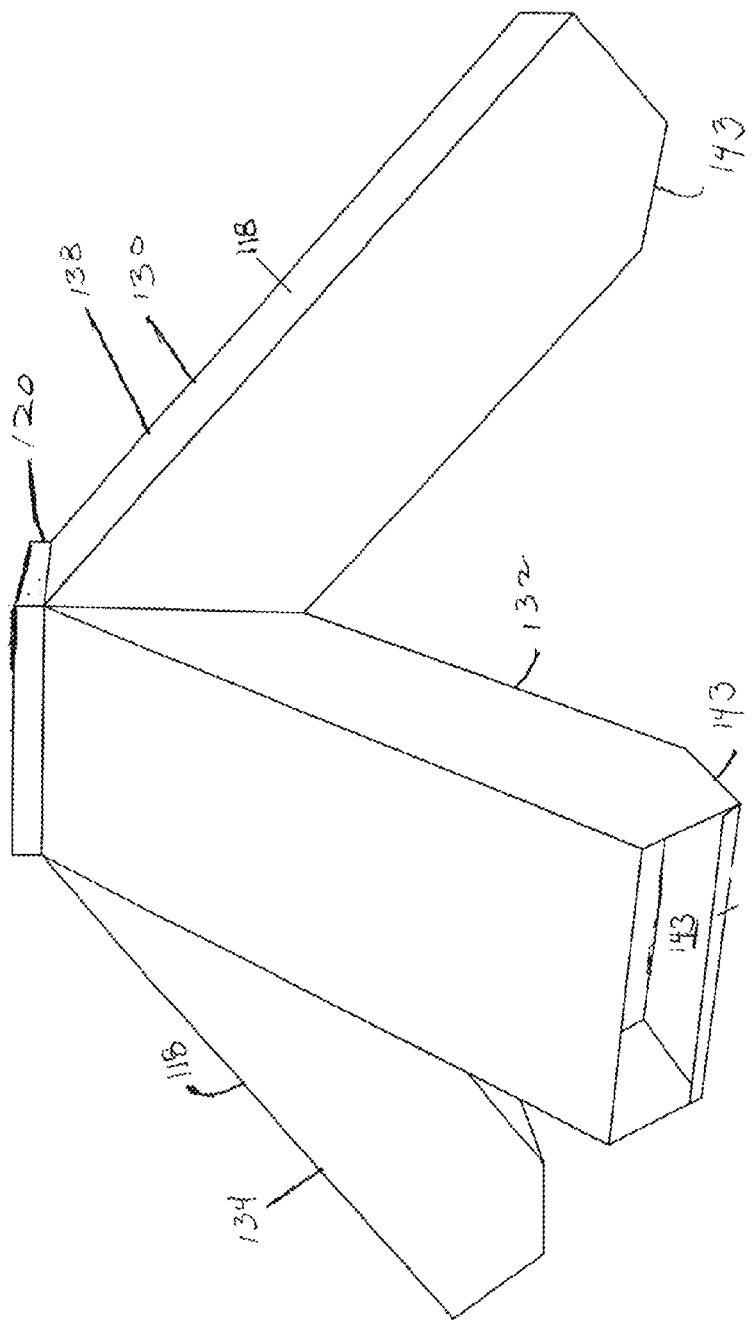
FIG. 10 is a perspective partial view of the hopper and head of an animal feeder according to an embodiment of the present disclosure.

Also, it should be appreciated that the perforations may be placed in different locations on a feeder according to embodiments of the present disclosure. For example, FIG. 9A depicts bottom wall 142 including angled-up portion 143. Similarly, FIGS. 10, 14A, 16 and 17A also each depict angled-up portion 143. Perforations (or perforated material) may be placed across angled-up portion 143. Further, FIGS. 15 and 15A include several darkened areas, and these may be perforated areas (i.e., areas where perforations or perforated material may be placed). It should be appreciated that perforations (or perforated material) may be placed in any location on a feeder where feed may be set where an animal may have access to the feed. The perforations may assist in allowing moisture and dust to escape; however, it should be appreciated that there are other embodiments of the present disclosure where the head may be manufactured without perforations.

Although the present disclosure and its advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure, processes, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

The invention claimed is:

1. An animal feeder for placement on the ground, the animal feeder comprising:
a hopper having a generally vertical hopper side walls and a top wall;
a plurality of legs engaging the hopper to support the hopper above a support surface;
a head engaging the hopper, the head having a multiplicity of depending feed troughs, each having a feed opening to receive particulate feed from the hopper and having a mouth at a removed end thereof, wherein each feed trough has a bottom wall, a pair of flat side walls and a flat top wall, the head receiving feed from the hopper, wherein the head further comprises a floor, wherein the floor has a perimeter, wherein each of the feed trough bottom walls includes a flat portion non-parallel to the top wall, that is angled up, towards the top wall; and wherein each of the feed trough bottom walls includes at the mouth, an upturned lip, each upturned lip having a top edge, and wherein the head includes a perforated material to filter dust and moisture from the particulate feed.

2. The feeder of claim 1, wherein the perforated material is releasably secured to the head.

3. The feeder of claim 1, wherein the perforated material is integrally formed with the head.

4. The feeder of claim 1, wherein the perforated material is permanently attached to the head.

5. The feeder of claim 4, wherein the perforated material is welded to the head.

6. The feeder of claim 1, wherein perforations are stamped into a bottom metal structure of the head.

7. The feeder of claim 1, further including a manifold engaging the hopper to the head and placing the head below the hopper, the manifold to carry particulate feed from the hopper to the head and the manifold including a perforated material.

8. The feeder of claim 1, wherein the floor includes an upturned and pointed portion positioned below a particulate feed flow path originating at the hopper; wherein the feed trough side walls make, with respect to the longitudinal axis of the wildlife feeder, an angle in the range of about 30 to 60 degrees; and further comprising a perforated material for controlling the amount of dust and moisture associated with the feed entering the head from the hopper.

9. The feeder of claim 1 wherein the perforated material is positioned on the floor of the head.

10. The feeder of claim 1 wherein the perforated material is positioned on the flat portion of each of the feed trough bottom walls.

* * * * *